(12) United States Patent
Chen

(10) Patent No.: US 12,155,634 B2
(45) Date of Patent: Nov. 26, 2024

(54) METAVERSE APPLICATION GATEWAY CONNECTION MECHANISM FOR USE IN A PRIVATE COMMUNICATION ARCHITECTURE

(71) Applicant: Primes Lab Inc., San Jose, CA (US)

(72) Inventor: Ben Wei Chen, Santa Ana, CA (US)

(73) Assignee: Primes Lab Inc., San Jose, CA (US)

( * ) Notice: Subject to any disclaimer, the term of this patent is extended or adjusted under 35 U.S.C. 154(b) by 0 days.

(21) Appl. No.: 17/849,741

(22) Filed: Jun. 27, 2022

(65) Prior Publication Data

US 2022/0329569 A1    Oct. 13, 2022

Related U.S. Application Data

(63) Continuation-in-part of application No. 17/736,103, filed on May 4, 2022, which is a continuation-in-part of application No. 17/229,156, filed on Apr. 13, 2021, now Pat. No. 11,863,529, which is a continuation-in-part of application No. 17/174,841, filed on Feb. 12, 2021, now Pat. No. 11,683,292, which is a continuation-in-part of application No. 16/807,481, filed on Mar. 3, 2020, now Pat. No. 11,356,417, which is a continuation-in-part of application No. 14/741,145, filed on Jun. 16, 2015, now Pat. No. 10,601,810, which is a continuation-in-part of application No. 14/663,244, filed on Mar. 19, 2015, now Pat. No. 9,935,930, (Continued)

(51) Int. Cl.
*H04L 9/40* (2022.01)
*H04L 12/46* (2006.01)
*H04L 67/104* (2022.01)

(52) U.S. Cl.
CPC ...... *H04L 63/0272* (2013.01); *H04L 12/4633* (2013.01); *H04L 63/083* (2013.01); *H04L 63/0876* (2013.01); *H04L 67/104* (2013.01)

(58) Field of Classification Search
CPC .............. H04L 63/0272; H04L 63/083; H04L 63/0876; H04L 12/4633; H04L 67/104
See application file for complete search history.

(56) References Cited

U.S. PATENT DOCUMENTS 9,853,834 B2    12/2017    Meier
2012/0179971 A1    7/2012    Appelman
(Continued)

FOREIGN PATENT DOCUMENTS

| KR | 10-2021-0015570 A | 2/2021 |
| TW | 201635164 A | 10/2016 |
| TW | 201701169 A | 1/2017 |

*Primary Examiner* — Blake J Rubin
(74) *Attorney, Agent, or Firm* — Winston Hsu

(57) ABSTRACT

A method for a connection mechanism in a public cloud network is disclosed. The method includes acquiring a plurality of connection credentials from a public cloud portal (PCP) Admin Device; pairing and registration with a metaverse virtual private network (VPN) server (MVVS) from a metaverse app gateway (MVAG); establishing a plurality of initial VPN tunnels between the MVVS and the MVAG; connecting to the MVAG on demand between a MVVS smart device client and the MVAG through the MVVS; and running a plurality of vertical peer-to-peer (P2P) private and secure MVVS smart device client applications between at least one MVVS smart device client and one of at least one MVAG smart device client, at least one MVAG network service and another MVVS smart device client.

23 Claims, 16 Drawing Sheets

Related U.S. Application Data which is a continuation-in-part of application No. 14/526,393, filed on Oct. 28, 2014, now Pat. No. 9,781,087, which is a continuation-in-part of application No. 14/450,104, filed on Aug. 1, 2014, now Pat. No. 10,237,253, which is a continuation-in-part of application No. 13/229,285, filed on Sep. 9, 2011, now Pat. No. 9,203,807.

(56) References Cited

U.S. PATENT DOCUMENTS

| | | |
|---|---|---|
| 2015/0288678 A1 | 10/2015 | Chen |
| 2016/0330200 A1 | 11/2016 | Ansari |
| 2018/0019981 A1 | 1/2018 | Leavy |
| 2021/0234835 A1 | 7/2021 | Chen |

METAVERSE APPLICATION GATEWAY CONNECTION MECHANISM FOR USE IN A PRIVATE COMMUNICATION ARCHITECTURE

CROSS REFERENCE TO RELATED APPLICATIONS

This application is a continuation-in-part of U.S. application Ser. No. 17/736,103, filed May 4, 2022; which is a continuation-in-part of U.S. patent application Ser. No. 17/229,156, filed Apr. 13, 2021; which is a continuation-in-part of U.S. application Ser. No. 17/174,841, filed Feb. 12, 2021; which is a continuation-in-part of U.S. application Ser. No. 16/807,481, filed Mar. 3, 2020; which is a continuation-in-part of U.S. application Ser. No. 14/741,145 filed Jun. 16, 2015, entitled "PRIVATE CLOUD ROUTING SERVER CONNECTION MECHANISM FOR USE IN A PRIVATE COMMUNICATION ARCHITECTURE", which is a continuation-in-part of U.S. patent application Ser. No. 14/663,244, filed Mar. 19, 2015, entitled "PRIVATE AND SECURE COMMUNICATION ARCHITECTURE WITHOUT UTILIZING A PUBLIC CLOUD-BASED ROUTING SERVER", which is a continuation-in-part of U.S. patent application Ser. No. 14/526,393, filed Oct. 28, 2014, entitled "PRIVATE AND SECURE COMMUNICATION ARCHITECTURE WITHOUT UTILIZING A PUBLIC CLOUD-BASED ROUTING SERVER", which is a continuation-in-part of U.S. patent application Ser. No. 14/450,104, filed Aug. 1, 2014, entitled "PRIVATE CLOUD ROUTING SERVER, PRIVATE NETWORK SERVICE AND SMART DEVICE CLIENT ARCHITECTURE WITHOUT UTILIZING A PUBLIC CLOUD-BASED ROUTING SERVER," which is a continuation-in-part of U.S. patent application Ser. No. 13/229,285, filed Sep. 9, 2011, entitled "PRIVATE CLOUD SERVER AND CLIENT ARCHITECTURE WITHOUT UTILIZING A ROUTING SERVER," all of which are incorporated herein by reference in their entireties.

BACKGROUND OF THE INVENTION

1. Field of the Invention

The present invention relates generally to networking and more particularly to the use of private cloud networks.

2. Description of the Prior Art

In the Internet connected environment, the Smart Device Clients including smart phone, tablet, eBook reader, notebook, PC and various smart gadgets are ubiquitous and omnipresent. Other than connectivity, one of the values of the Smart Device Clients is to be able to connect at any time and any place to acquire services from one or many serving parties or servers. The services include audio, video contents, live or archived information, and execution of applications, social media, messaging, email, storage, backup, calendar, contact, synchronization, sharing, remote desktop, Internet of Things (IoT) and others. Other services include real-time private and secure video, audio, text and application communication between at least two Smart Device Clients. There are different types of servers that serve these various requests from the Smart Device Clients. In general, these types of servers can be categorized to fall into two groups: a public cloud and a private cloud. Servers in the public cloud, implied by the name "public", provide services that tend to be free with limited functionality or fee-based with more sophisticated services and interact with the public. Examples of the public cloud server include data center, social media services and storage/content provider through the Internet. On the other hand, servers in the private cloud tend to address the private need. The services provided are more private and personal as opposed to those offered by the public cloud.

One example of the application of the private cloud server (PCS) is a private cloud storage server (PCSS). The PCSS sits within the local area network (LAN) managed by the user. It provides on-line and backup storage for the user either within the LAN or in the wide area network (WAN). The user is able to use a Smart Device Client to access information within the PCSS at anytime from anywhere. The PCSS and the associated Smart Device Client therefore form an example of the PCS and a Client architecture.

Conventionally, there are many storage server solutions, including network attached storage (NAS), Windows/Mac/Linux server, and direct attached storage (DAS) to fulfill the PCSS requirement. But the challenge for the Smart Device Clients in the field has been how to avoid the cumbersome setup to penetrate the firewall behind the router on the LAN to access the PCSS in a home or office environment. There are at least four kinds of solutions to this challenge.

One solution is to assign a fixed Internet Protocol (IP) address and open certain ports for the router in front of the PCSS, such that the Smart Device Client is able to locate the PCSS from outside the LAN and to authenticate itself, penetrate the firewall and establish a secure communication channel with the PCSS.

A second solution applies when a fixed IP address is not available. The user configures the LAN router of the PCSS and opens certain ports to map to the PCSS. The router is therefore able to be located by the intended Smart Device Client through a dynamic domain name service (DDNS) service on the WAN. The Smart Device Client can authenticate itself, penetrate the firewall and establish a secure communication channel with the PCSS.

A third solution is to rely on another routing server in the WAN to conduct the virtual private network (VPN) communication between the Smart Device Client and the PCSS. The VPN communication allows the Smart Device Client to locate the PCSS, authenticate itself, penetrate the firewall and establish a secure communication channel with the PCSS.

A fourth solution is to rely on another routing server in the WAN to conduct the remote desktop protocol (RDP) or virtual network computing (VNC) communication between the Smart Device Client and the PCSS. The RDP/VNC communication allows the Smart Device Client to locate the PCSS, authenticate itself, penetrate the firewall and establish a secure communication channel with the PCSS. Other solutions can be mix-and match of the above-mentioned solutions.

In a first scenario, a fixed IP address is required and the router needs to be set up and configured. The down side is that a fixed IP involves more cost and is usually not available in the home and small business environment. The router set up and configuration can be very complicated and are not user friendly with most consumers.

In a second scenario, a DDNS service is required and the router needs yet more complex set up. Again, the DDNS set up involves additional cost and complexity into the system. The router set up and configuration can be very complicated and is not user friendly with most consumers.

In a third and fourth scenarios, an outside routing server or service needs to be established, while a router set up is not necessary. The outside routing server or service controls and handles login/authentication between the Smart Device Client and the server. The private cloud becomes less private and less secure through the public cloud-based server or service. If for any reason the server or service is down, the communication and availability of the PCSS will be jeopardized.

All of these scenarios require technical expertise that may be suitable for conventional corporate environment, but these scenarios are not suitable for consumer oriented Smart Device Client centric deployment.

In most conventional systems, an outside or public cloud-based routing server is used by the Smart Device Client during access to a Private Cloud Service. Using an outside server creates a number of concerns to the Smart Device Client owner.

First, the sense of trust is always in question, because the outside or public cloud-based routing server is a middleman during all communication transactions between the Smart Device Client and the Private Cloud Service. It may hold all user account info, password and their corresponding IP addresses of the Smart Device Client and the Private Cloud Service. The routing server is able to sniff any communication in-between and render it insecure.

Second, being an outside and public cloud-based routing server, the business model of the owner of server may not always be in-line or in-sync with the Smart Device Client owner. If the routing server is out of service due to any business reason, there is no remedy or option of replacement to restore the service. The routing server potentially poses a tremendous business risk to the user as the vital link in the communication can be broken without recourse.

Conventionally, in the case of communication between two Smart Device Clients, both parties need to sign into a public cloud-based server in order to conduct real-time video, audio, text or application communication. The privacy and security are easily compromised due to the fact that the communication has to go through a public cloud-based server, as outlined above.

In addition, the IoT devices which are the building blocks of the smart appliances at home, have been plagued by the fragmentation of various standards from Matter, Apple HomeKit, Google Nest, Amazon Alexa, and many others. Due to the interoperability, compatibility, as well as the privacy and security issues of the IoT devices, the adoption rate of the smart appliances at home has been below expectation.

Accordingly, what is needed is a system and method that addresses the above identified issues. The previous invention, with a private cloud VPN server (PCVS) and a private matter gateway (PMG) in a private metaverse (PM) environment, addresses such a need.

Further, as Internet evolves into Web 3.0, Metaverse started to emerge in order to provide the use-case scenario for a specific group of users to access a set of specific contents in a private and secure manner. Such a use-case scenario in the public cloud Metaverse, mimics the previous invention of private metaverse in a broader scale. The similarities are that instead of a PCVS, it is replaced with a Metaverse VPN Server (MVVS), while a PMG is replaced with a Metaverse App Gateway (MVAG). The differences are that the MVAG is deployed by the metaverse provider in its own metaverse app environment, instead of in the case of the PMG, which is deployed by the user in the private LAN. Also, the MVAG contents, which are metaverse application specific, such as archived contents, live streaming events, and domain specific contents, differ from those of the PMG which are tune more towards IoT devices or network services on the user private LAN. The present invention intends to address such a need.

SUMMARY OF THE INVENTION

A method for use with a public cloud network is disclosed. The method includes setting up at least one public cloud portal (PCP), at least one virtual machine server (VMS), at least one PCP Admin Device, at least one metaverse virtual private network (VPN) server (MVVS), at least one VPN tunnel, and at least one MVVS smart device client on the side of the MVVS to provide cloud-based web services, and at least one metaverse application (MA) which includes at least one private router, at least one private local area network (LAN), at least one metaverse app gateway (MVAG), at least one MVAG Admin Device, at least one metaverse network service (MVNS), and at least one MVAG smart device client on the side of the MVAG private LAN in a client server relationship. The MVVS smart device client, such as a smart phone, tablet, notebook, or Tesla dashboard operates in the public cloud, while a MVAG smart device client, such as a notebook (NB), Internet of Things (IoT) device, network attached storage (NAS), set-top-box (STB), smart appliance, archived content server, live streaming event content, or media server, resides on the private and secure LAN. The present invention is based on a decentralized peer-to-peer (P2P) communication architecture to provide to the users with access convenience as well as privacy and security at the same time. The at least one PCP and the at least one VMS which includes MVVS, usually reside in a hyperscale data center located on a public cloud network, while the at least one MA along with MVAG and the at least one MVAG smart device client or network service reside in the metaverse provider's application environments. The metaverse VPN server relays communication between the MVVS smart device client on the side of the MVVS and the MVAG. The MVVS will call back the MVAG on demand based on the MVVS smart device client request. The at least one VPN tunnels are enabled and established between the MVVS and MVAG. The at least one VPN tunnels are enabled and established between the MVVS and MVVS smart device client. The two VPN tunnels are channeled into one single VPN tunnel between the MVVS smart device client and the MVAG through the MVVS. All communication from this point onwards between the MVVS smart device client and the MVAG through the MVVS is secure and private. All MVAG smart device clients along with the network services on the private LAN of the MA are available for access in the LAN mode for future VPN connection from the MVVS smart device clients. From this point on, the MVAG and the MVVS are in standby mode waiting for future access from the MVVS smart device clients in the public cloud from Internet.

The at least one PCP is initially accessed by the at least one MVVS client to log in and acquire the connection credentials including the MVVS server passcode, the VMS domain name, the MVVS VPN client profile file, and the MVVS VPN client passcode. The MVVS VPN client profile file and the MVVS VPN client passcode can then be sent to any authorized MVVS client for future access. With these two credentials, the authorized MVVS client can then connect through the PCP to the targeted VMS and in turn to the corresponding MVVS. Once connected, the first VPN tunnel between the MVVS client and the MVVS is enabled. The at least one MVAG in the private LAN of the MA, will enable a third VPN tunnel on demand with the at least one MVVS in the public cloud as soon as (or if) the proper credentials are established. The at least one MVVS in the public cloud will in turn call back the at least one MVAG in the private LAN to enable a first VPN tunnel. The at least one MVAG in the private LAN of the MA, will in turn establish a first VPN tunnel with the at least one MVVS in the public cloud as soon as (or if) the first VPN tunnel is enabled by MVVS. A second VPN channel is also enabled by the MVVS for the at least one MVVS smart device client. The at least one MVVS smart device client starts request for connection to the at least one MVVS through the MVVS VPN client profile to establish a third VPN tunnel on demand, in case that the at least one MVVS smart device client intends to access to any MVAG smart device client or a MVNS on the private LAN of the MA. The at least one MVVS in the public cloud will in turn call back the at least one MVAG in the private LAN of the MA, to establish a third VPN tunnel on demand, and relay communication between the MVVS smart device client from the Internet and the MVAG residing on the private LAN of the MA. The second VPN tunnel on demand and the third VPN tunnel on demand are channeled into one single VPN tunnel between the MVVS smart device client and the MVAG through the MVVS. From this point onwards, all communication between the MVVS smart device client and the MVAG through the MVVS is secure and private. All MVAG smart device clients along with the network services on the private LAN of the MA are available for access in the LAN mode for future VPN connection from the MVVS smart device clients. Both the MVAG and the MVVS are in standby mode waiting for future access from the MVVS smart device clients in the public cloud from Internet.

In summary, the present invention sets up at least one MVVS in a client server relationship with at least one MVAG. The at least one MVVS and the at least one MVAG privately and securely communicates with each other through the public cloud network. It sets up the at least one MVVS smart device client in a client server relationship with the at least one MVVS. It sets up at least one MVAG smart device client and at least one MVAG MVNS in a client server relationship with the at least one MVAG. It sets up at least one MVVS smart device client in a client server relationship with the at least one MVAG. The at least one MVVS smart device client and the at least one MVAG communicates with each other through the public cloud network. The at least one MVVS smart device client and the at least one MVAG smart device client privately and securely communicates with each other through the public cloud network. The at least one MVVS smart device client and the at least one MVAG MVNS privately and securely communicates with each other through the public cloud network.

The VPN tunnels are based on the industry standard that guarantee privacy and security, as well as future proof interoperability and compatibility in communication. All MVAG clients, including IoT devices, along with the network services on the private LAN are thus available for access in the LAN mode, from the MVVS client thought VPN connection in a private and secure manner. Unlike the prior art, which is dependent on the cloud mode access of the clients or the IoT devices on the private LAN through a cloud-based relay server, the present invention relies solely on the LAN mode access through the VPN channels. The access content itself is never and cannot be monitored or recorded due to the strength of the industry recognized VPN tunnel, The present invention is therefore much more private and secure in access communication compared with those of offered by most other prior art. The network connection is based on the Internet protocol. The solution is therefore platform agnostic and simultaneously compatible with all existing fragmented IoT device platforms, be it Matter, Apple HomeKit, Google Nest, or Amazon Alexa, as long as the IoT devices are LAN discoverable and networkable. For further consideration of security, the connection credentials including the MVVS server passcode, the VMS domain name, the MVVS VPN client profile file, and the MVVS VPN client passcode, can all be revoked and re-issued per the request of the admin account of the MVVS clients from the cloud through Internet.

The present invention requires the future MVAG clients, i.e., the IoT devices, to operate in LAN mode, instead of in cloud mode, in order to achieve absolute privacy and security for the users. By doing so, the IoT devices no longer need to provide their own cloud-based relay server. The consequential benefits to the users are:

a. Breaking up the monopoly in app and IoT device access from mobile operating system (OS) providers like Apple and Google;
b. Access convenience from anywhere in the world through Internet;
c. True access privacy and security;
d. Interoperability and compatibility with Matter, Apple HomeKit, Google Nest, and Amazon Alexa, at the same time;
e. Lowering the entry barrier in IoT device manufacturing, as no more cloud-based relay server is required from the IoT manufacturers;
f. Re-instilling confidence in consumers to spur future IoT device sales;
g. Opening up new vertical app for IoT markets in secure chat, audio, and video and others; and
h. Future proof implementation, based on the industry Internet protocol in network and communication access.

For the purpose of accessing one MVAG smart device client, or IoT device at home from another MVVS smart device client anywhere in the world, the present invention maintains the benefits of access convenience, ease of deployment, great privacy and security, full compatibility/interoperability, and high performance.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
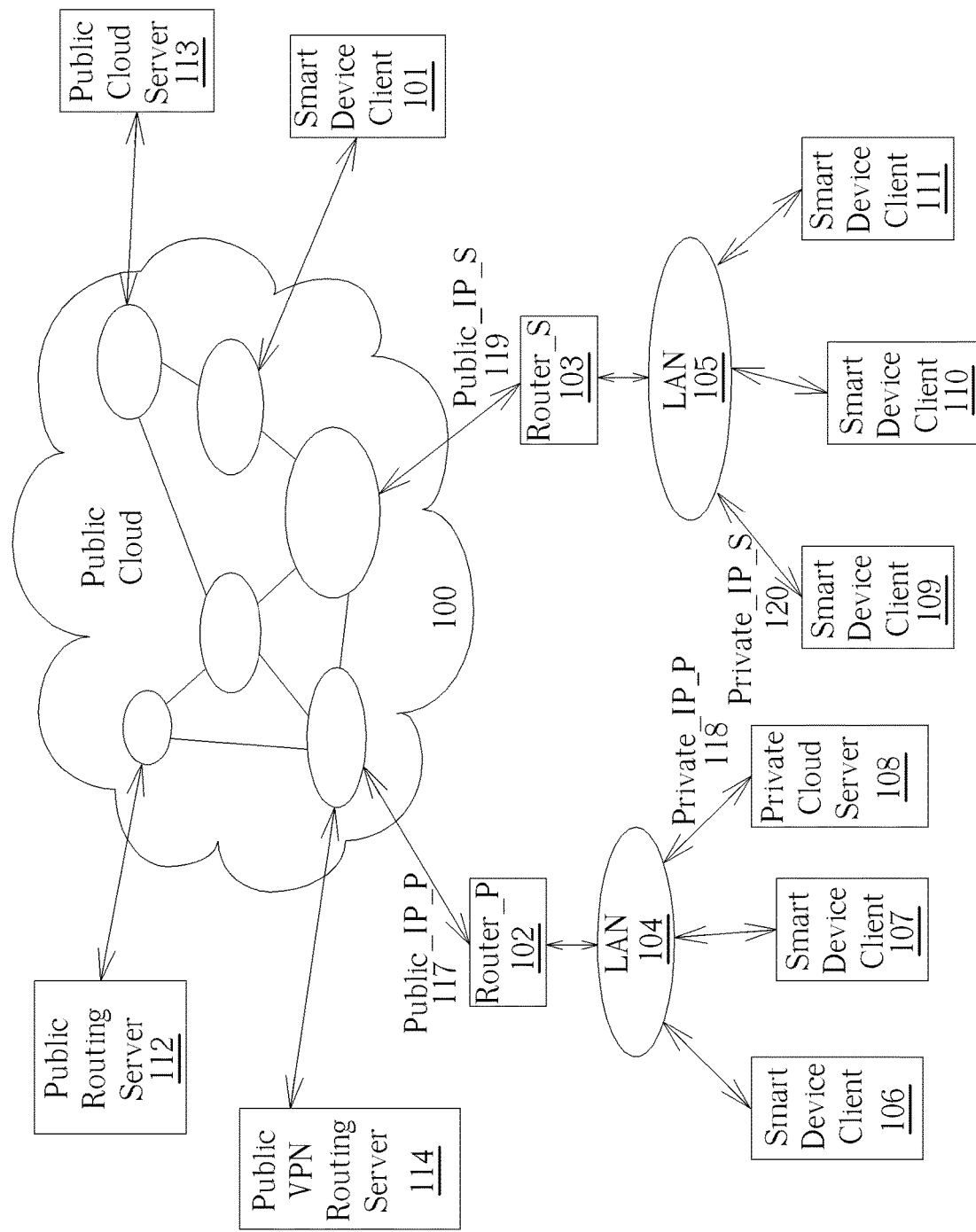
FIG. 1 is a block diagram of a conventional Cloud Network Infrastructure.

The present invention relates generally to networking and more particularly to the use of private cloud networks. The following description is presented to enable one of ordinary skill in the art to make and use the invention and is provided in the context of a patent application and its requirements. Various modifications to the embodiments and the generic principles and features described herein will be readily apparent to those skilled in the art. Thus, the present invention is not intended to be limited to the embodiments shown, but is to be accorded the widest scope consistent with the principles and features described herein.

The term "Client" is interchangeable with "Smart Device Client" throughout discussion in the context. The term "router" is in general interchangeable with "gateway", "access point" and/or "NAT" (network address translation) in the discussion.

A system and method in accordance with the present invention addresses the following challenges in a consumer-oriented environment for a Smart Device Client in a wide area network (WAN) to be able to obtain services from a Private Cloud Storage Server (PCSS) or any Private Cloud Server (PCS):

1. Access the PCS at anytime from anywhere.
2. Access the PCS behind the firewall with fixed or dynamic Internet Protocol (IP) address.
3. Require no public cloud-based routing server in the WAN.
4. Require no additional router setup in a local area network (LAN).
5. Authenticate with the PCS.
6. Establish a secure communication channel with the PCS.

If such challenges can be met and resolved, the deployment of the PCS or service will increase exponentially, due to plug and play simplicity and availability. The technical and business concern will also be removed by not utilizing a public cloud-based routing server. The PCS being utilized for storage, remote desktop service and Internet of Things (IoT) becomes very affordable and ubiquitous in the private cloud infrastructure.

In the private cloud environment, if there are more than one PCSs or services co-existing at the same time, it is advantageous to separate out the functions of PCS into two functional blocks including a Private Cloud Routing Service (PRS) and a Metaverse network service (MVNS). The MVNS is designed to be managed and accessed on the private network environment, be it wired or wireless, by the Smart Device Client. Examples of a MVNS include application program server to provide remote desktop protocol (RDP), VNC, office tools, media player, and other user specific applications. The MVNS may also function as a storage server that contains multiple terabytes of storage serving the private cloud. Functions of the PRS of the multiple Private Matter Gateways (MVAGs) can then be aggregated together into just one MVAG. The MVAG can generally be referred to as a Private Cloud Router.

A system and method in accordance with the present invention addresses the following challenges in the consumer-oriented environment for utilizing the Smart Device Client in the WAN to be able to manage and access the MVNS from a MVAG:

1. Access the MVAG at anytime from anywhere.
2. Access the MVAG behind the firewall with fixed or dynamic IP address.
3. Require no outside or public cloud-based routing server in the WAN.
4. Require no additional router setup in the LAN.
5. Authenticate with the MVAG.
6. Establish a secure communication channel with the MVNS to manage and access.

If the MVAG can fulfill the above-mentioned challenges, heterogeneous PCSs from different manufacturers and vendors can then be broken down into simpler MVNSs and remove the complexity of private cloud setup, configuration and access.

The purpose of a system and method in accordance with the invention is to provide a MVAG, the MVNS and Client architecture without utilizing a routing server. The system and method in accordance with the present invention addresses the above identified challenges that to allow a Client to be able to access the MVNS from anywhere at anytime. The system and method also access the MVNS behind a firewall with fixed or dynamic IP, requires no additional router setup and no public cloud-based routing server in the WAN, to authenticate with the MVAG, and to establish a secure communication channel directly with the MVNS.

As shown in FIG. 1, a cloud network infrastructure includes a public cloud 100, a public cloud server 113, a public routing server 112, a public virtual private network (VPN) routing server 114, a Smart Device Client 101 in the WAN, a Router_P 102 and a Router_S 103. The Router_S 103 connects between a LAN 105 and the Internet in the public cloud 100. The Router_P 102 connects between a LAN 104 and the Internet in the public cloud 100. Behind the LAN 104, there are Smart Device Clients 106, 107 and a PCS 108. Behind the LAN 105, there are Smart Device Clients 109, 110 and 111. The Smart Device Client can be a PC, notebook, tablet, Tesla dashboard, smart phone, eBook reader, GPS, smart TV, set top box, MP3 player, or any networkable embedded device.

The Smart Device Clients are denoted in the Cloud Network Infrastructure as 101, 106, 107, 109, 110, and 111. Any one of the Smart Device Clients above is interchangeable in the context and discussion. The focus on this discussion is the Smart Device Client 109, as the representative in this context.

Physically, there are three scenarios that a Smart Device Client 101, 107 or 109 can connect to the PCS 108. First, a Smart Device Client 107 determines whether the target is in the locally accessible LAN 104 and decides to connect to the PCS 108 directly. Second, the Smart Device Client 101 determines the target is not in the locally accessible LAN 104 and decides to connect through the WAN to the public cloud 100. The WAN locates the Router_P 102 and the LAN 104, and then connects to the PCS 108. Third, the Smart Device Client 109 determines the target is not in the locally accessible LAN 105 and decides to passes through the LAN 105, the Router_S 103, and connects to the public cloud 100 in the WAN.

The Smart Device Client 109 then locates the Router_P 102, the LAN 104, and connects to the PCS 108. The first and the second scenario are two special cases and derivatives of the third scenario. Therefore, it is beneficial to focus on the third scenario that is broader in scope and complexity.

Figure 2:
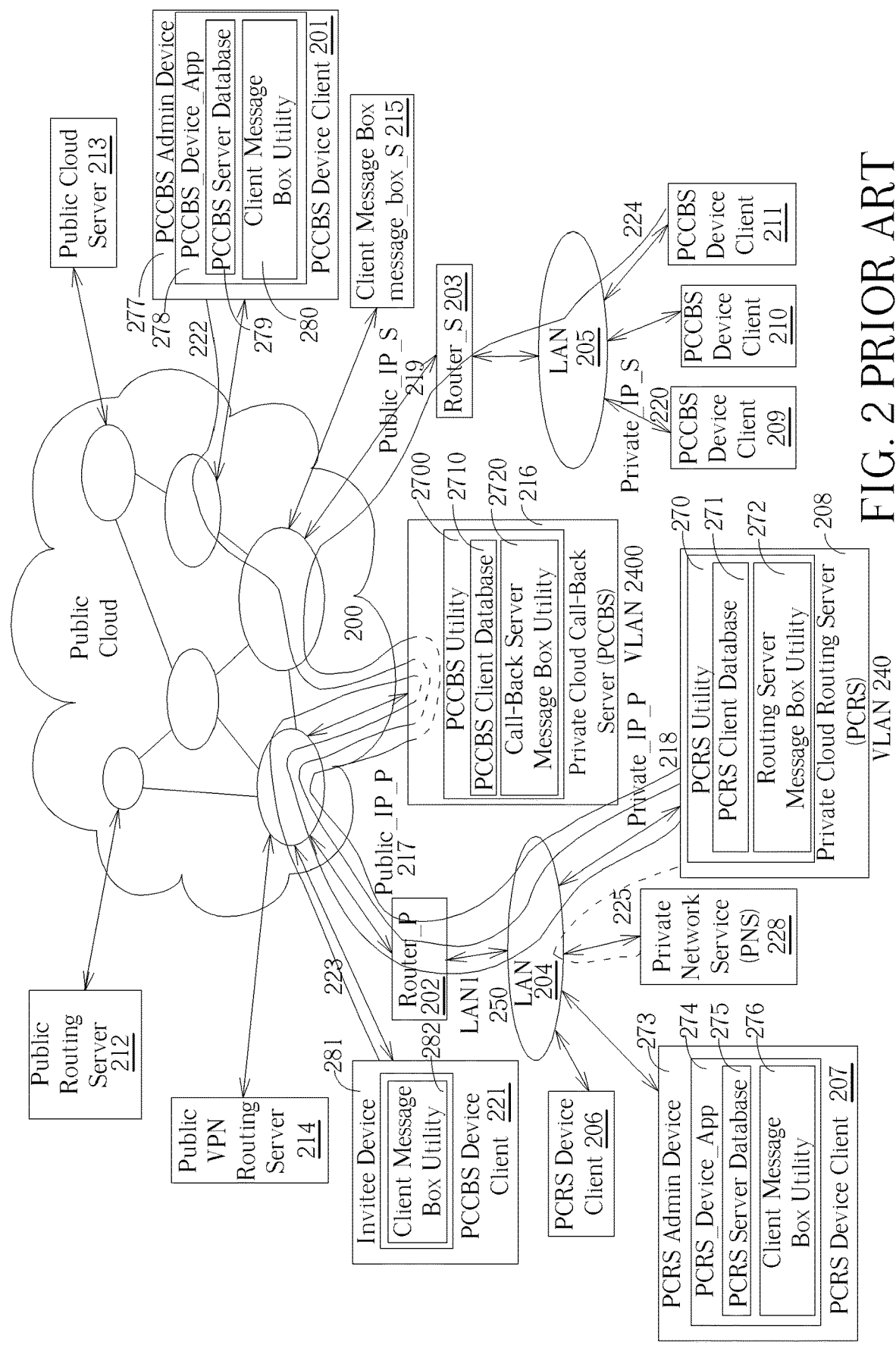
FIG. 2 is a block diagram of a Cloud Network Infrastructure for the connection mechanism based on session-based message box communication among the Private Cloud Routing Server, the PCCBS, the MVNS, the PCRS smart device client, and the PCCBS smart device client.

As shown in FIG. 2, a cloud network infrastructure includes a public cloud 200, a public cloud server 213, a public routing server 212, a public VPN routing server 214, a PCCBS Smart Device Client 201 in the WAN, a Router_P 202 and a Router_S 203. The Router_S 203 connects between a LAN 205 and the Internet in the public cloud 200. The routing server message box (not shown) or a Client Message Box message_box_S 215 can be hosted inside an email server, text message server, web server, or any kind of server that can host secure message for information exchange between the Private Cloud Routing Server (PCRS) 208, and the Private Cloud Call-Back Server (PCCBS) 216, as a server, the PCRS smart device client 206, 207, and the PCCBS smart device client 209, 210, 211, 201, 221, as a client. The Call-Back Server Message Box (not shown) or the Client Message Box message_box_S 215, is accessible and under the secure and private control of either PCRS 208, and the PCCBS 216, as a server, or the PCRS smart device client 206, 207, and the PCCBS smart device client 209, 210, 211, 201, 221, as a client. The security and business model of the message box is well understood and expected in the industry by the user. For any reason either message box is down, it can be replaced or redeployed immediately without jeopardizing the communication between the server and the client in the private cloud infrastructure.

Figure 3:
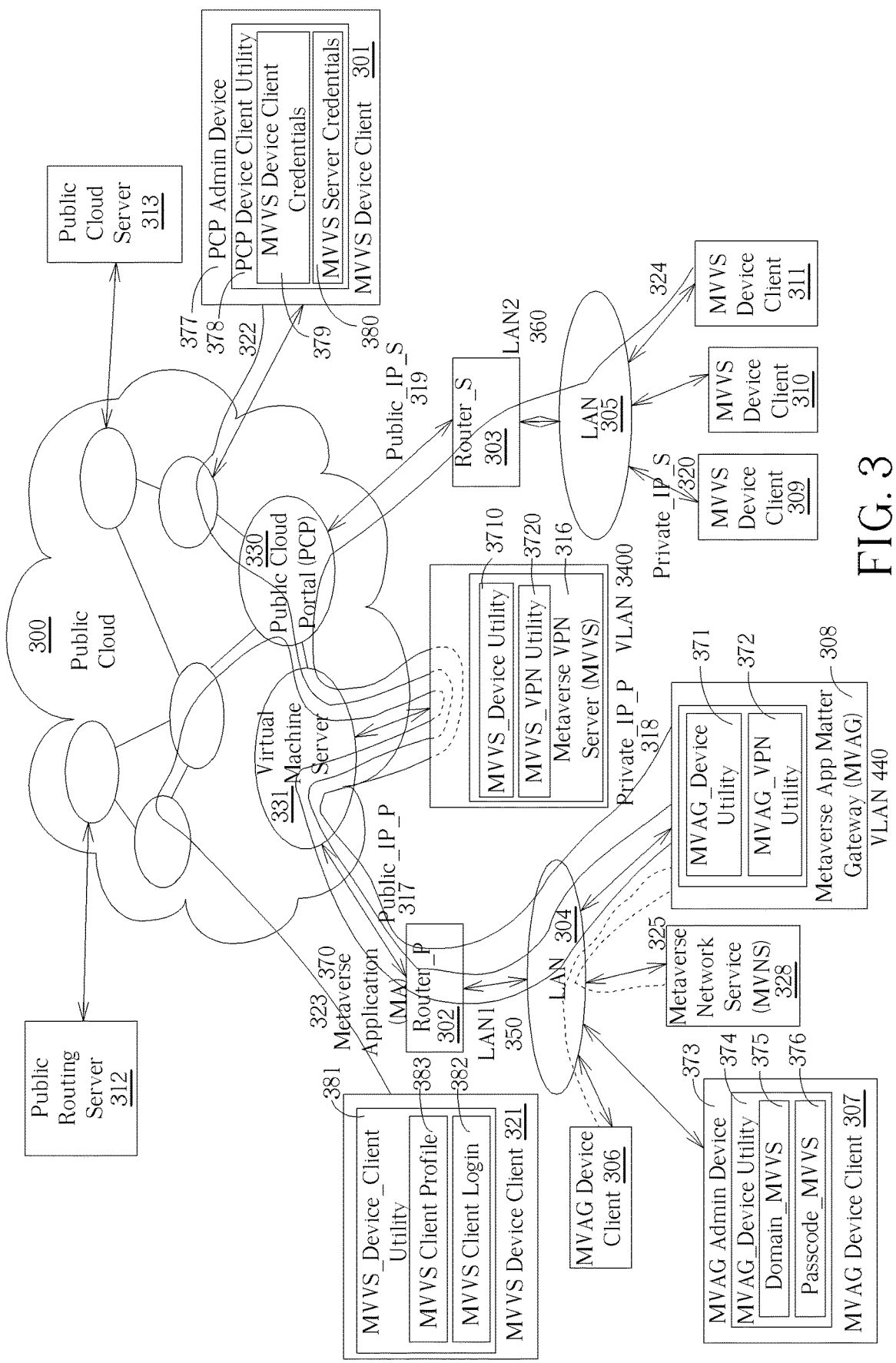
FIG. 3 is a block diagram of a first embodiment of a Cloud Network Infrastructure for the connection mechanism based on channeling multiple VPN tunnels among the MVAG, the Metaverse VPN server, the MVNS, the MVAG smart device client, and the MVVS smart device client in accordance with the present invention.

FIG. 3 shows a block diagram of a first embodiment of a Cloud Network Infrastructure for a secure connection mechanism among the MVAG, the Metaverse VPN server, the MVAG smart device clients, and the metaverse VPN server (MVVS) Smart Device Clients for the exploring and accessing of MVNS across the public cloud. There are five phases in the connection mechanism between a MVVS Device Client in the cloud, and a MVAG Device Client on the private LAN. The five phases are:

Phase one, acquiring connection credentials from a public cloud portal (PCP) Admin Device;

Phase two, pairing and registration with a MVVS from a MVAG;

Phase three, establishing initial VPN tunnels between the MVVS and the MVAG;

Phase four, connecting to the MVAG on demand between the MVVS smart device client and the MVAG through the MVVS; and Phase five, running vertical peer-to-peer (P2P) private and secure MVVS smart device client applications between at least one MVVS smart device client and at least one MVAG smart device client, at least one MVAG network service, or yet another MVVS smart device client.

In Phase one: acquiring the connection credentials from the PCP Admin Device: To start with, a PCP Admin Device 377, which is itself a MVVS device client 301, logins to a PCP Device Utility (not shown) of a PCP 330 to acquire MVVS Device Client Credentials 379 and MVVS server Credentials 380. The MVVS Device Client Credentials 379 include a MVVS client Profile 383 and a MVVS client Login 382. The MVVS server Credentials 380 include a Domain MVVS 375 and a Passcode_MVVS 376. Both of the MVVS Device Client Credentials 379 and the MVVS server Credentials 380 are stored in a PCP Device Client Utility 378. The MVVS server Credentials 380 are later sent through email to a MVAG Admin Device 373 for connection to a MVAG 308. The MVVS Device Client Credentials 379 are later sent through email to a MVVS Device Client 321 for connection to a MVVS 316.

In Phase two, pairing and registration with the MVVS from the MVAG: The MVAG Admin Device 373 uses the utility MVAG_Device Utility 374 to initialize and provision the MVAG 308 from MVAG Admin Device 373. As shown in FIG. 3, the MVAG 308 contains a MVAG_Device Utility 371 and a MVAG_VPN Utility 372. The MVAG Admin Device 373 is located on the same physical LAN 304 as that of the MVAG 308, in order to conduct configuration for security purpose to avoid hacking exposure on Internet or WAN. The Admin Device 373 is itself a MVAG smart device client 307. It contains an application utility MVAG_Device Utility 374, which in turn contains an entry of the Domain MVVS 375 and an entry of the Passcode_MVVS 376. The entry of the Domain MVVS 375 is used to set the server domain address of the corresponding MVVS. The entry of the Passcode_MVVS 376 is used to set the server passcode of the corresponding MVVS. The MVAG Admin Device 373 first configures the MVVS server credentials by setting its domain name through the entries of the Domain MVVS 375 and the passcode Passcode_MVVS 376. The MVVS server credentials, the Domain MVVS 375 and the Passcose_MVVS 376 are used to communicate with the MVAG_Device Utility 371 in the MVAG 308.

In Phase three, establishing the initial VPN tunnels between the MVVS and the MVAG: After the MVVS 316 pairing and registration with the MVVS 316 from the MVAG 308, the MVAG_VPN Utility 372 connects to a MVVS_VPN Utility 3720 and enables a third VPN channel between the MVAG_VPN Utility 372 and the MVVS_VPN Utility 3720. The MVVS_VPN Utility 3720 then calls back to a MA 370, which contains at least one MVAG (e.g., the MVAG 308), which in turn contains the MVAG_VPN Utility 372 to enable a first VPN channel between the MVVS_VPN Utility 3720 and the MVAG_VPN Utility 372. The MVVS_VPN Utility 3720 can establish a third VPN tunnel on demand between the MVVS_VPN Utility 3720 and the MVAG_VPN Utility 372. The MVVS_VPN Utility 3720 can also establish a third VPN tunnel on demand between the MVVS_VPN Utility 3720 and the MVAG_VPN Utility 372, pending the completion in establishing a second VPN tunnel on demand between the MVVS smart device client 309, 310, 311 or 321, and the MVVS 316. Afterwards, the MVAG_VPN Utility 372 can establish a first VPN tunnel between the MVAG_VPN Utility 372 and the MVVS_VPN Utility 3720. The MVVS_VPN Utility 3720 also enables a second VPN channel between the MVVS_VPN Utility 3720 and any MVVS Device Client 301, 309, 310, 311, or 321, from the cloud in the Internet. The MVVS 316 is then ready for further action on demand from any MVVS Device Client 301, 309, 310, 311, or 321. The MVVS_VPN Utility 3720 communicates with the MVVS Device Utility 3710, internally inside the MVVS 316. The MVVS Device Utility 3710 stays in a loop waiting on demand for the future MVVS smart device client request.

In Phase four, connecting to the MVAG on demand between the MVVS smart device client and the MVAG through the MVVS: The MVVS_VPN Utility 3720 communicates with the MVVS_Device Utility 3710, internally inside the MVVS 316. The MVVS_Device Utility 3720 stays in a loop waiting on demand for the MVVS smart device client request. The MVVS Device Client 321 first registers to the MVVS_Device Utility 3710, with the MVVS client credentials, including the MVVS client Profile and MVVS client Login. The MVVS Device Utility 3710 passes the MVVS client credentials and the connection request internally inside MVVS 316, to the MVVS_VPN Utility 3720. After registration, the MVVS Device Client 321 connects to the MVVS_VPN Utility 3720 and establishes a second VPN tunnel on demand between MVVS Device Client 321 and MVVS_VPN Utility 3720. The MVVS_VPN Utility 3720 then establishes a third VPN tunnel on demand between the MVVS_VPN Utility 3720 and the MA 370, which contains at least one MVAG (e.g., the MVAG 308), which in turn contains the MVAG_VPN Utility 372. The second VPN tunnel on demand and the third VPN tunnel on demand are channeled into a single VPN between MVVS_Device Client 321 and MVAG_VPN Utility 372, which resides in the MVAG 308.

Figure 8:
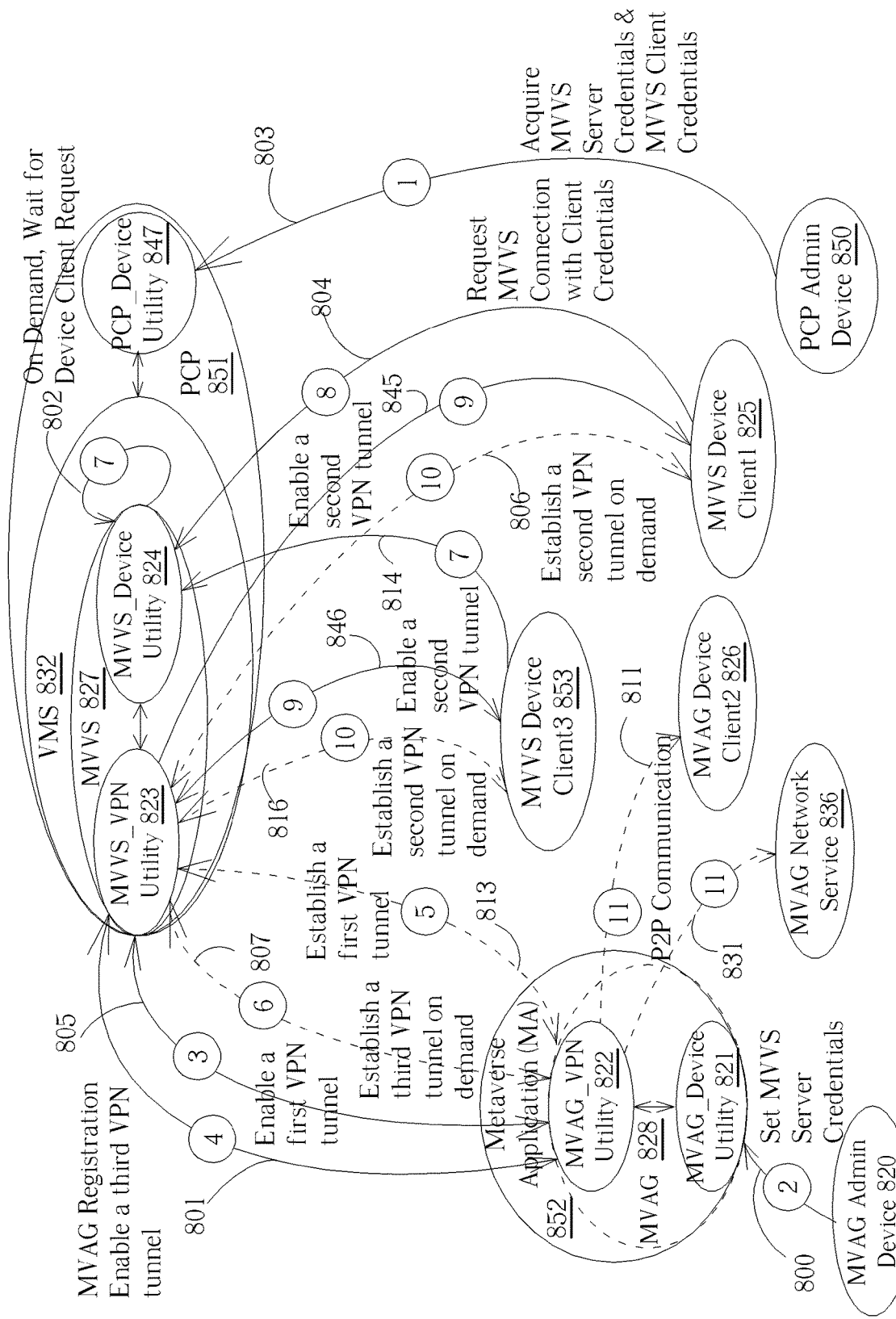
FIG. 8 is a diagram of a communication flow of P2P Connection Mechanism among MVAG, MVVS, MVVS smart device client, and a MVAG smart device client through a Cloud Network.

In Phase five, running the vertical P2P private and secure MVVS smart device client applications between the at least one MVVS smart device client and the at least one MVAG smart device client, the at least one MVAG network service, or yet another MVVS smart device client: The MVVS smart device client 301, 311 and 321, through the communication path 322, 324 and 323 respectively are able to locate the MVAG 308 with the mechanism disclosed in FIGS. 8-13. The MVAG 308 and the MVVS 316 then build a virtual LAN (VLAN) 340 and a VLAN 3400 allowing the authorized MVVS smart device clients 301, 311 and 321 to join in as members of the VLAN 340 and the VLAN 3400, and in turn connecting to a MVAG Device Client 306, or a MVNS 328 (e.g., MVAG Network Service), or yet another MVVS Device Client (not shown), assuming another MVVS Device Client (not shown) has also successfully connected to the MVVS_VPN Utility 3720. Refer to FIG. 8 for details in VPN tunnels and connection flow. The MVVS smart device client 301 through the installed program can initiate a private and secure communication as a host. The MVVS smart device client 311 or 321 through the installed program can receive the communication invitation as a guest and join the private and secure communication session with the host MVVS smart device client 301, through a vertical P2P private and secure MVVS smart device client application (not shown) offered by Public Cloud Portal 330.

In Phase five, the at least one MVAG smart device client and a MVVS smart device client application form a client server relationship. The MVVS smart device client application includes an application Utility on a public cloud network. The functionality of the at least one MVAG smart device client is defined by a class code sent to a MVVS smart device client application. The vendor-specific software modules or applications are loaded by the MVVS smart device client application to support the corresponding MVAG smart device client from different manufacturers. The device classes include audio, video, human interface device, IP Camera, Smart Lock, Smart Lightbulb, remote control, thermostat, printer, mass storage, Bluetooth, application specific, vendor specific, and others.

As shown in FIG. 3, when the MVVS smart device client 301 wants to start a communication session as a host, the program installed on the host MVVS smart device client first locates and logs-in to the PCP 330 through the communication path 322. After the MVVS 316 locating the MVAG 308, it joins the VLAN 340. The MVVS smart device client commits to join chat communication as a host 301. The program allows the MVVS smart device client 301 to create and host a communication session. The program broadcasts the host session to invite communication guest 321. Afterwards, the program starts scanning for recognizable guest MVVS smart device client 321. Once the guest is authenticated, the MVVS smart device client 301 can start private and secure communication as a host with the authenticated guest MVVS smart device client 321. The private and secure communication includes video, audio, text or application. The application can be a program, utility, operation or transaction that is recognizable by both host and guest.

If the MVVS smart device client 311 or 321 wants to join a communication session as a guest, the program installed on the guest MVVS smart device client first locates and logs-in to the PCP 330 through the communication path 324 or 323 respectively. After the MVVS 316 locating the MVAG 308, it joins the VLAN 340 under the server. The MVVS smart device client 311 or 321 commits to join the communication as a client. The program waits for a communication invitation. Once it receives a communication invitation, the MVVS smart device client 311 or 321 may join a communication session as a guest. The program then starts scanning for recognizable host. Upon identifying the host, the program goes through the communication log-in authentication prompted by the host. Once authenticated, the MVVS smart device client 311 or 321 can join the communication session. The MVVS smart device client 311 or 321 starts private and secure communication as a guest with the host MVVS smart device client 301. The private and secure communication includes video, audio, text or application. The application can be a program, utility, operation or transaction that is recognizable by both host and guest.

In another embodiment of the present invention, the MVVS smart device client can establish a private and secure communication with any service that is reachable on the physical LAN LAN1 350 or the VLAN 340 and the VLAN 3400, under the MVAG and the Metaverse VPN server. As shown in FIG. 3, once the MVVS smart device client 301, 311 or 321 locates and logs-in to the PCP 330, it may access any MVNS 328 that is reachable on the physical LAN LAN1 350, and the physical LAN LAN2 360, the VLAN 340 and the VLAN 3400 under the MVAG and the MVVS through a secure communication path 325. The MVNS includes audio, video contents, live or archived information, and execution of applications, social media, messaging, email, storage, backup, calendar, contact, synchronization, sharing, remote desktop, IoT and others.

A number of entities are introduced to allow for the secure communication path 325 including but not limited to: Administrator, Admin Device, MVAG Utility, MVVS Utility, MVAG smart device client, MVVS smart device client. These entities are defined herein below. Utility is a utility running in the MVAG. Admin Device is a device that administrator uses to configure the MVAG. MVAG smart device client is a device that an Invitee uses to communicate with the MVAG. Invitee is a physical party invited by the Admin to access the MVAG service and resources. Invitee Device is a MVAG smart device client that the Invitee uses to communicate with the MVAG.

A number of terms are introduced including Passcode_MVVS, Domain MVVS Client, MVVS Client Profile, and MVVS Client Login. These terms are defined hereinbelow. Passcode_MVVS is a passcode generated by the PCP for the corresponding MVVS 316. Domain MVVS is the domain address generated by the PCP Passcode_MVVS and Domain MVVS together form the MVVS server credentials. MVVS Client Profile is the VPN profile file for the MVVS smart device client to connect to the corresponding MVVS 316. MVVS Client_Login is the VPN login password for the MVVS smart device client to connect to the corresponding MVVS 316. MVVS Client Profile and MVVS Client Login together form the MVVS client credentials.

Other terms not associated with the MVAG are: MA and Virtual LAN subnet. They are defined herein below. The MA is a private network subsystem which includes a network router, a private LAN, a MVAG, at least one MVNS, and at least one MVAG smart device client. The virtual LAN subnet is the subnet setting of the MVAG VPN (virtual private network). It is configurable and changeable to specify the private subnet for security purpose.

The device client 301 is itself a MVVS smart device client. It contains an application utility, the PCP Device Client Utility 378, which in turn contains the MVVS Device Client Credentials 379 and the MVVS server Credentials 380. The MVVS Device Client Credentials 379 contains the MVVS client Profile and the MVVS client Login. The MVVS server Credentials 380 contains the Domain MVVS and the Passcode_MVVS.

The typical MVVS smart device client 321 contains a MVVS_Device_Client Utility 381 which in turn contains the MVVS client Profile 383 and the MVVS client Login 382. The MVVS client Profile 383 is used to connect to the corresponding MVVS 316. The MVVS client Login 382 is used to login to the corresponding MVVS 316. The MVVS 316 contains the MVVS_Device Utility 3710 and the MVVS_VPN Utility 3720. The MVVS_Device Utility 3710 is used to communicate with the MVAG Admin Device 373. The MVVS VPN Utility 3720 is able to communicate with the MVAG 308 through the at least one VPN tunnel. The MVVS 316 acts as a middleman to relay communication between the MVVS smart device clients 321, 301, 311 and the MVAG 308. It will call back the MVAG 308 on demand based on the MVVS smart device client request.

Figure 4:
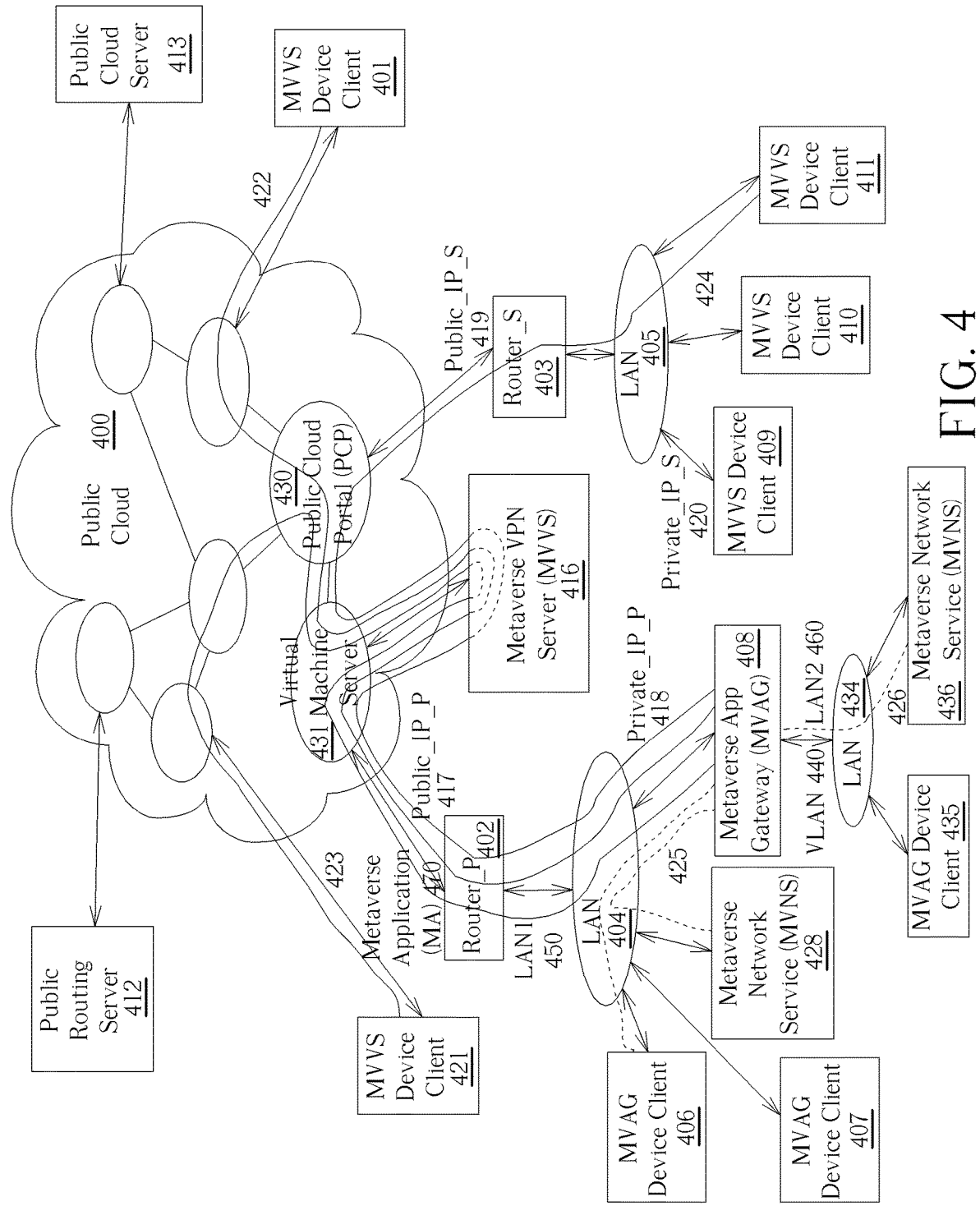
FIG. 4 is a block diagram of a second embodiment of a Cloud Network Infrastructure for the connection mechanism based on channeling multiple VPN tunnels among the MVAG, the Metaverse VPN server, the MVNS, the MVAG smart device client, and the MVVS smart device client in accordance with the present invention.

FIG. 4 shows a block diagram of a second embodiment of the invention. A MVAG 408 connects to a LAN 404 of a Router_P 402, in a manner similar to the way the PCRS 208 connects to the LAN 204 of the Router_P 202 in FIG. 2. The MVAG 408 also has a physical LAN LAN2 460 connecting downstream. A MVNS 436 and a MVAG smart device client 435 are connected downstream. The MVNS 436 is accessible through the communication path 426, connecting through a LAN 434 to the MVAG 408. As long as the VLAN 440, the physical LAN LAN1 450, and the physical LAN LAN2 460 are all explorable and accessible by the MVVS smart device clients 411, 410, 409, 401, and 421 across the cloud through the MVVS 416, and the MVAG 408, all MVNSs 428 and 436, and MVAG smart device clients 406, 407, and 435 become accessible.

Figure 5:
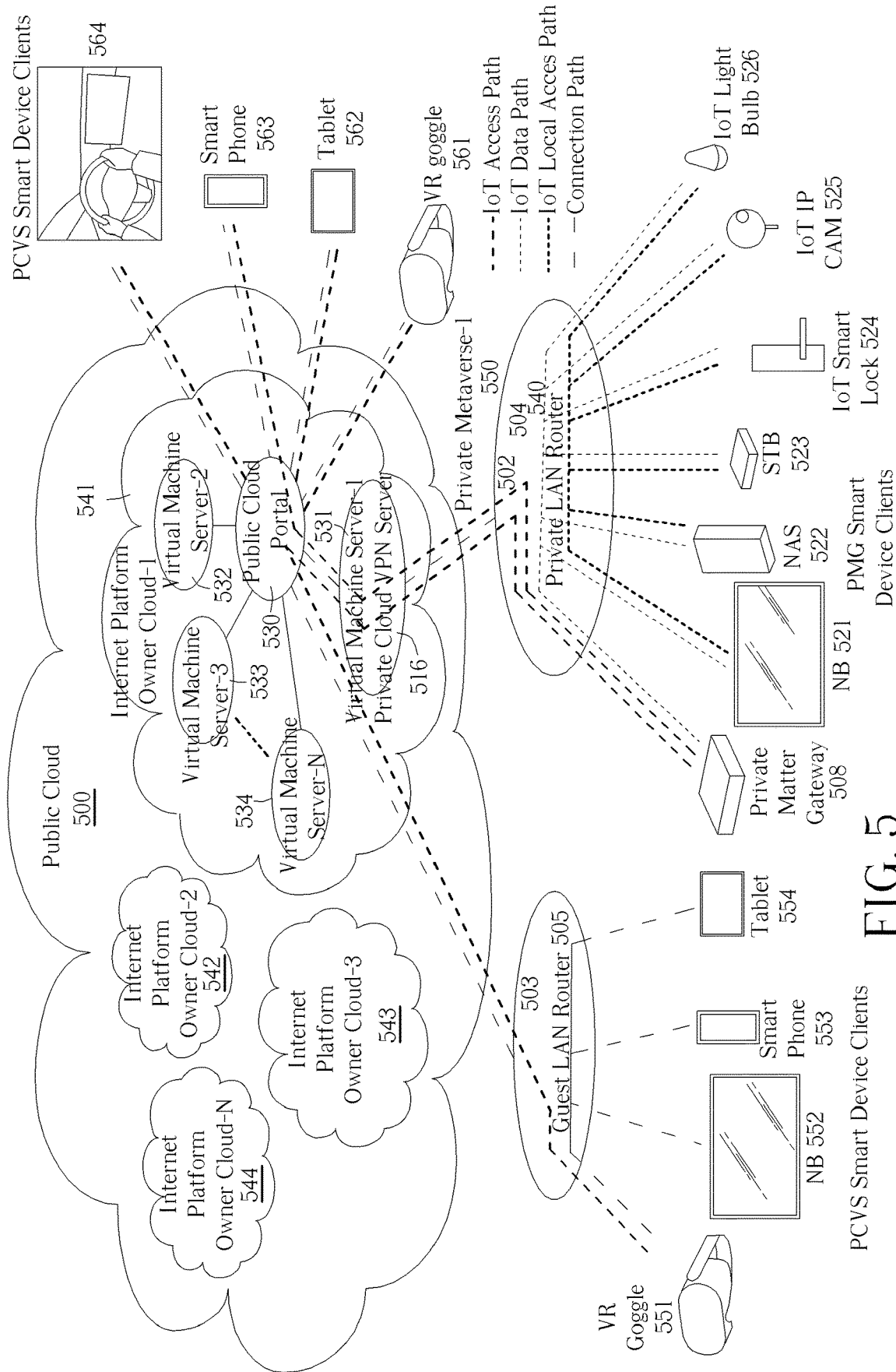
FIG. 5 is a block diagram of a previous embodiment of a Cloud Network Infrastructure for the connection mechanism based on channeling multiple VPN tunnels among the PMG, the Private Cloud VPN Server, the PNS, the PMG smart device client, and the PCVS smart device client in accordance with the previous invention.

FIG. 5 shows a block diagram of a previous embodiment of the invention. The PMG 508 connects to a LAN 504 of a Private LAN Router 502, in a manner similar to the way the PCRS 208 connects to the LAN 204 of the Router_P 202 in FIG. 2. As long as the Private Metaverse-1 550, and the physical LAN 504 are all explorable and accessible by the PCVS Smart Device Clients (e.g., a VR goggle 551, a notebook (NB) 552, a smart phone 553, a tablet 554, a VR goggle 561, a NB 562, a smartphone 563 and a Tesla dashboard 564), across the cloud through the Virtual Machine Server-1 531 and the Private Cloud VPN Server 516, and the PMG 508, all PNS (not shown), and PMG Smart Device Clients 521, 522, 523, 524, 525, and 526 become accessible.

Figure 6:
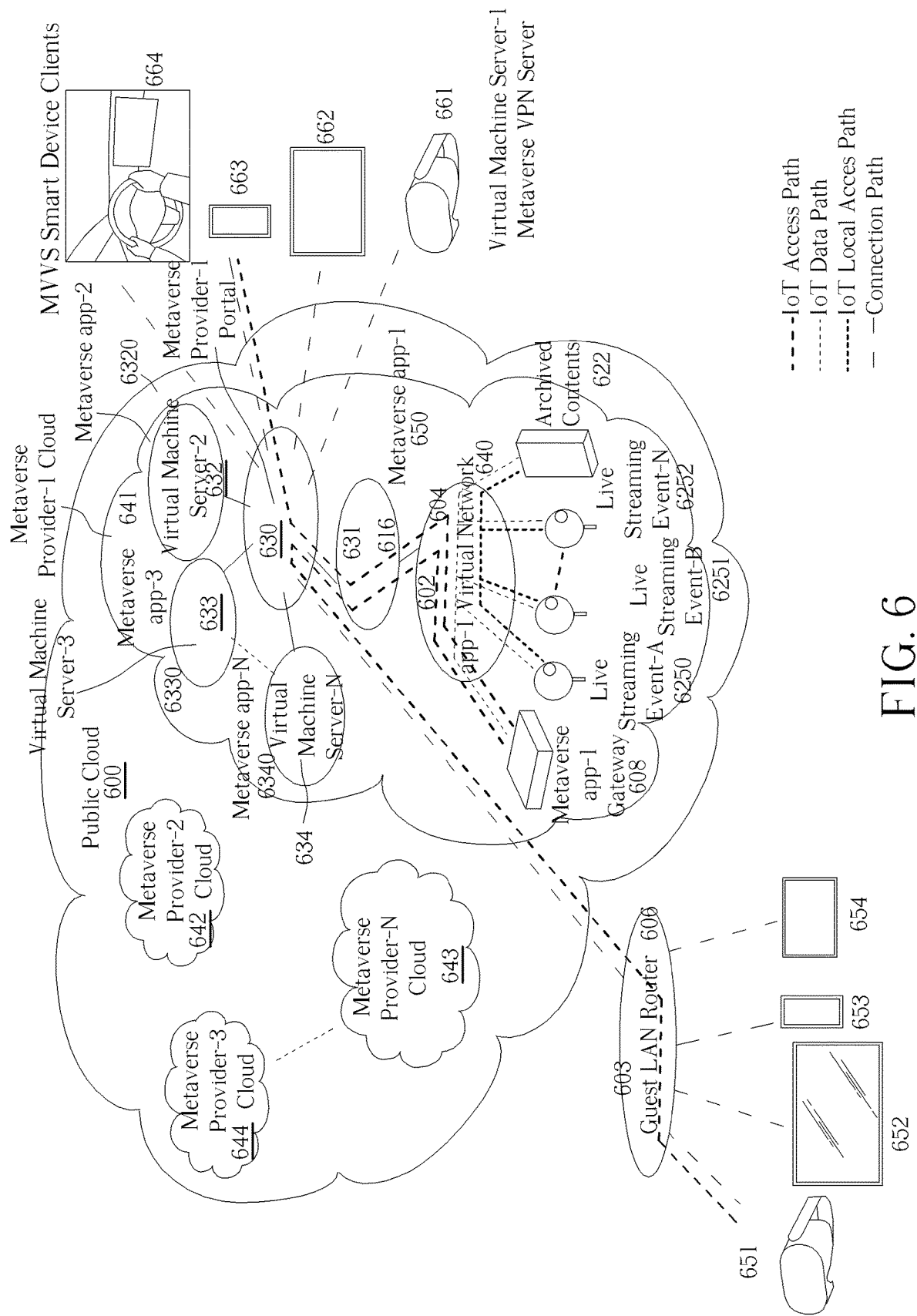
FIG. 6 is a block diagram of a third embodiment of a Cloud Network Infrastructure for the connection mechanism based on channeling multiple VPN tunnels among the MVAG, the Metaverse VPN server, the MVNS, the MVAG smart device client, and the MVVS smart device client in accordance with the present invention.

FIG. 6 shows a block diagram of a third embodiment of the invention. A MVAG 608 connects to a LAN 604 of a Private LAN Router 602, in a manner similar to the way the MVAG 308 connects to the LAN 304 of the Router_P 302 in FIG. 3. As long as a Metaverse app-1 (MA1) 650, and the physical LAN 604 are all explorable and accessible by MVVS smart device clients (e.g., a VR goggle 651, a NB 652, a smart phone 653, a tablet 654, a VR goggle 661, a NB 662, a smartphone 663 and a Tesla dashboard 664), across the cloud through a Virtual Machine Server-1 631 and a MVVS 616, and the MVAG 608, all MVNS (not shown), and MVAG smart device clients 6250, 6251, 6252, and 622 become accessible. There could many metaverse providers in a public cloud 600, with each provider establishes a metaverse provider-1 cloud 641, a metaverse provider-2 cloud 642, a metaverse provider-3 cloud 644, and a metaverse provider-N cloud 643. Inside the metaverse provider-1 cloud 641, through a metaverse provider-1 portal 630, there are multiple MAs that can be deployed, such as the MA1 650, a metaverse app-2 (MA2) 6320, a metaverse app-3 (MA3) 6330, and a metaverse app-N (MAN) 6340. Inside the MA1 650, there is a corresponding virtual machine server-1 631, which in turn contains the MVVS 616. The MVVS 616 is then logically connecting to an app-1 virtual network 640, which accommodates the router 602, the private LAN 604. Underneath the app-1 virtual network 640, there are a number of physical and logical devices, resources, and services, including the MVAG 608, live streaming events 6250, 6251, 6252, and an archived contents server 622. The live streaming event-A 6250, the live streaming event-B 6251, and the live streaming event-C 6252, are a set of IP CAMs setup by a metaverse provider-1 (not shown) for the purpose of establishing a specific metaverse application (e.g., the MA1 650) to stream a specific live event for a specific group of metaverse subscribers, who can access the metaverse event contents through the MVVS device clients, the Tesla dashboard 664, the smartphone 663, the tablet 662, and the VR goggle 661, or other device clients under a guest LAN router 603, including the NB 652, the smartphone 653, the tablet 654, and the VR goggle 651. The metaverse provider-1 cloud 641 is scalable and expandable as shown in FIG. 6. There can be many metaverse provider clouds, such as the metaverse provider-1 cloud 641, the metaverse provider-2 cloud 642, the metaverse provider-3 cloud 644, and the metaverse provider-N cloud 643, coexist with each other in the public cloud 600. There also can be many MAs, such as the MA1 650, the MA2 632, the MA3 633, and the MAN 634, deployed by the same metaverse provider portal 630, inside the same metaverse provider-1 cloud 641. A metaverse provider can offer to its subscribers a private and secure access to the devices, services, contents, or events with the assistance of the present invention. The type of the devices, services, contents, or events include media content services, live event streaming, gaming, virtual tour, virtual museum, private chat in text, audio, and video, crypto currency trading, VR/AR experience, virtual avatar and many others.

Figure 7:
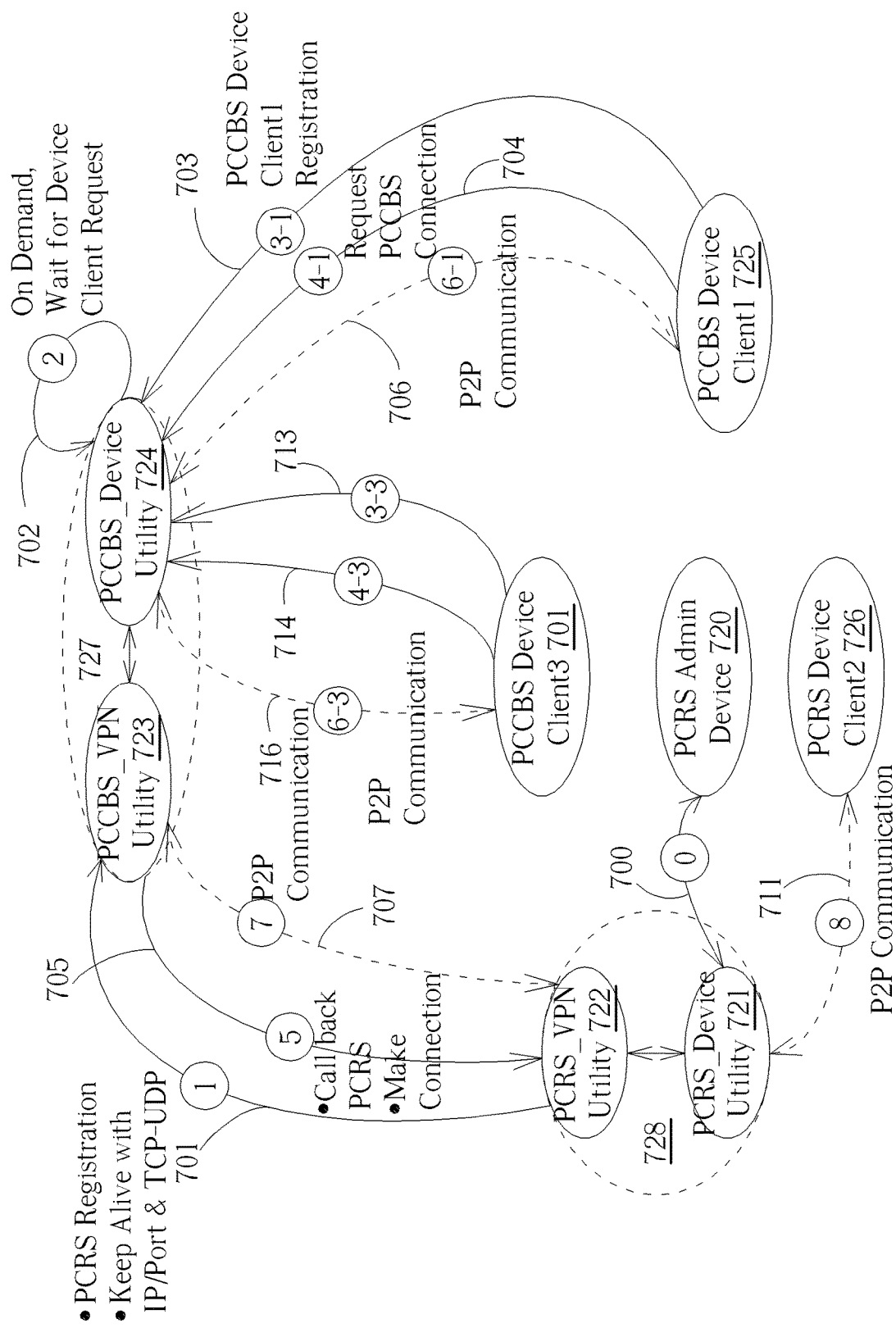
FIG. 7 is a diagram of a communication flow of P2P Connection Mechanism among PCRS, PCCBS, PCCBS smart device client, and a PCRS smart device client through a Cloud Network.

FIG. 7 is a diagram of a communication flow of P2P Connection Mechanism between a Private Cloud Relay Server (PCRS) and a PCCBS smart device client through a Cloud Network. It shows in accordance to the present invention that no Public VPN Routing Server is required for the PCCBS Smart Device Clients to connect and access to either the PCRS 728, or another PCCBS Smart Device Client, or another PCRS Smart Device Client, or the network services under the server through the Cloud Network. As shown in FIG. 7, a PCCBS Device Client1 725 and a PCRS 728 on the Cloud Network can communicate with each other without going through the Public Routing Server 112 or the Public VPN Routing Server 114 in FIG. 1. The PCCBS Device Client1 725 first requests to connect to a PCCBS Device Utility (Server part) 724, with its IP address and port capability in TCP/UDP protocols. The PCCBS Device Client1 725's IP address and ports are kept alive with the PCCBS Device Utility 724. The PCCBS_Device Utility (Server part) 724 receives the registration through a Call-Back Server Message Box (not shown). The PCCBS Device Client1 725 then requests to the PCCBS Device Utility (Server part) 724 also through the Client Message Box message_box_S 215 in FIG. 2 for connection to a PCCBS_VPN Utility (Client part) 723. The PCCBS Device Utility (Server part) 724 receives the request through the Call-Back Server Message Box (not shown) and notifies the PCCBS_VPN Utility (Client part) 723 with the IP address and port capability in TCP/UDP protocols of the PCCBS Device Client1 725 and its intention to connect 703. The PCCBS VPN Utility (Client part) 723 then replies to the PCCBS_Device Utility (Server part) 724 with its own registration that includes its IP address and port capability in TCP/UDP protocols. The IP address and port capability of a PCRS Device Client2 726 are kept alive with connection to the PCCBS_Device Utility (Server part) 724. The PCCBS Device Utility (Server part) 724 then responds to the PCCBS Client Device1 725 with the IP address and port capability in TCP/UDP protocols of the PCRS VPN Utility 722 through the Call-Back Server Message Box (not shown) via a communication route 705. The PCRS_VPN Utility 722 then activates a P2P communication to connect to PCCBS_VPN Utility 723. Afterwards, the PCCBS_Device Utility 724 starts listening in a loop 702, to wait for a device client request from the PCCBS Device Client1 725. As soon as the PCCBS Device Client1 725 initiates a communication request to the PCCBS_Device Utility 724, it establishes a P2P communication channel 706 with the PCCBS Device Utility 724. It in turns triggers another P2P communication between the PCCBS_VPN Utility 723 and the PCRS_VPN Utility 722. From this point on, the PCCBS Device Client1 725 connects to the PCRS VPN Utility 722 and is in turn able to access any PCRS Device Client 720 or network service (not shown). The P2P communication starts between the PCCBS Device Client1 725 and the PCRS_VPN Utility 722. The PCCBS Device Client1 725 can then securely connect to a virtual private LAN on a PCRS private LAN. The PCCBS Device Client1 725 is able to access any PCRS Smart Device Client (e.g., the PCRS Device Client2 726) or PNS (not shown) accessible under the PCRS private LAN. Other PCCBS smart device clients 201, 221, 209, 210, 211 in FIG. 2 can connect to the PMG through the same connection mechanism as shown in FIG. 7. Once any pair of PCRS smart device clients and PCVS smart device clients connect to the VLAN 240 and the VLAN 2400 of the PCRS 728 and the PCCBS 727, they can conduct the private and secure communication between themselves for text, audio or video communication.

FIG. 8 is a diagram of a communication flow of P2P Connection Mechanism between MVAG, MVVS, a MVAG smart device client and a MVVS smart device client through a Cloud Network. It shows in accordance with the present invention that no Public Cloud Routing Server is required for the MVVS smart device clients to connect and access to either the Server MVAG 828, MVVS 827, or another MVAG smart device client, or the network services under the server through the Cloud Network. As shown in FIG. 8, a MVVS Device Client1 825 and a MVAG 828 on the Cloud Network can communicate with each other without going through the Public Routing Server 112 or the Public VPN Routing Server 114 in FIG. 1. Unlike the prior art in FIG. 7, initially, one of the MVVS Device Clients, a PCP Admin Device 850, connects to a PCP 851, which is a cloud-based public cloud portal, which contains a PCP_Device Utility 847, as in circle 1, 803. The PCP Admin Device 850 acquires MVVS server Credentials as well as MVVS client credentials from the PCP_Device Utility 847. The MVVS server Credentials include Domain MVVS, the MVVS server domain, and Passcode_MVVS, the MVVS server passcode. The MVVS client credentials include MVVS client Profile, the client login profile file, and the MVVS client Login, the login password of the client profile. The MVVS server Credentials are sent to the MVAG Admin Device 820 via email or other means. The MVVS client credentials are sent to authorized MVVS Device Clients, such as the MVVS Device Client1 825, for future P2P connection with one of the MVAG Device Clients, such as a MVAG Device Client2 826 on the private LAN of the MVAG 828. The PCP 851 contains at least one PCP_Device Utility (e.g., the PCP_Device Utility 847), which in turn contains at least one Virtual Machine Server (VMS) (e.g., a VMS 832), which in turn contains at least one MVVS (e.g., a MVVS 827), which in turn contains a MVVS_Device Utility 824 and a MVVS_VPN Utility 823. The VMS 832 along with the MVVS 827 forms a one-to-one corresponding relationship with the MVAG 828, deployed in the private LAN. The PCP_Device Utility 847 is a public cloud portal which is scalable and may correspond to the at least one VMS (e.g., the VMS 832) and the at least one MVVS (e.g., the MVVS 827).

The MVAG Admin Device 820, after receiving the MVVS server Credentials, first initializes and provisions the MVAG 828 with the server credentials through the MVAG_Device Utility 821, as described in circle 2, 800. The MVAG_Device Utility 821 then passes the info internally inside the MVAG 828, to a MVAG_VPN Utility 822. It then registers to the MVVS_VPN Utility 823 with the MVVS server credentials info that includes the Domain MVVS and Passcode_MVVS through the TCP/UDP protocols, as in circle 4, 801. The MVVS_VPN Utility 823 then calls back to a MA 852, which contains at least one MVAG (e.g., the MVAG 828), which in turn contains the MVAG_VPN Utility 822 to enable a first VPN channel between the MVVS_VPN Utility 823 and the MVAG_VPN Utility 822, as in circle 3, 805. Afterwards, the MVAG_VPN Utility 822 establishes a first VPN tunnel between the MVAG_VPN Utility 822 and the MVVS_VPN Utility 823, as in circle 5, 813. After registration, the MVAG_VPN Utility 822 connects to the MVVS_VPN Utility 823 and enables a third VPN tunnel on demand between the MVAG_VPN Utility 822 and the MVVS_VPN Utility 823. The MVVS_VPN Utility 823 can establish a third VPN tunnel on demand between the MVVS_VPN Utility 823 and the MVAG_VPN Utility 822, as in circle 6, 807. The MVVS_VPN Utility 823 can also establish a third VPN tunnel on demand between the MVVS_VPN Utility 823 and the MVAG_VPN Utility 822, pending the completion in establishing a second VPN tunnel on demand, as in circle 10, 806. The MVVS_VPN Utility 823 also enables a second VPN channel between the MVVS_VPN Utility 823 and any MVVS Device Client (e.g., the MVVS Device Client1 825 or a MVVS Device Client3 853), as in circle 9, 845 or 846, from the cloud in the Internet. The MVVS 827 is then ready for further action on demand from any MVVS_Device Client (e.g., the MVVS Device Client1 825) from the cloud in the Internet. The MVVS_VPN Utility 823 communicates with a MVVS_Device Utility 824, internally inside the MVVS 827. The MVVS_Device Utility 824 stays in a loop waiting on demand for the MVVS smart device client request, as circle 7, 802. The MVVS Device Client1 825 first registers to the MVVS_Device Utility 824, with the MVVS client credentials, including the MVVS client Profile and the MVVS client Login, as in circle 8, 804 or 814. The MVVS_Device Utility 824 passes the MVVS client credentials and the connection request internally inside the MVVS 827, to the MVVS_VPN Utility 823. After registration, the MVVS Device Client1 825 connects to the MVVS_VPN Utility 823 and establishes a second VPN tunnel on demand between the MVVS Device Client1 825 and the MVVS_VPN Utility 823, as in circle 10, 806 or 816. The MVVS_VPN Utility 823 then establishes a third VPN tunnel on demand between the MVVS_VPN Utility 823 and the MA 852, which contains at least one MVAG (e.g., the MVAG 828), which in turn contains the MVAG_VPN Utility 822, as in circle 6, 807. The second VPN tunnel on demand as in circle 10, 806 and the third VPN tunnel on demand as in circle 6, 807 are channeled into a single VPN between the MVVS_Device Client1 825 and the MVAG_VPN Utility 822 and in turn connecting to the MVAG Device Client2 826, as in circle 11, 811, or a MVAG Network Service 836 as in circle 11, 831, or yet another MVVS Device Client (e.g., the MVVS Device Client3 853) as in circle 10, 816, assuming another MVVS Device Client (e.g., the MVVS Device Client3 853) has also successfully connected to the MVVS_VPN Utility 823. The MVVS Device Client1 825 and the MVVS Device Client3 853 therefore form a P2P private and secure communication channel between them, which is the foundation for further secure chat applications in text, audio, and video, including crypto currency transaction.

Compared with the prior art in FIG. 7, the present invention is more scalable and expandable, as it introduces a few new entities, including the PCP 851, the PCP_Device Utility 847, the VMS 832, the MA 852, the PCP Admin Devices 850, the MVAG Admin Device 820, the MVVS server Credentials, and the MVVS client credentials. It connects first to a Public Cloud Portal, then to at least one PCP_Device Utility 824, then to at least one VMS (e.g., the VMS 832), then to the at least one MVVS (e.g., the MVVS 827), then to at least one MA (e.g., the MA 852), then to at least one MVAG (e.g., the MVAG 828), then to at least one MVAG Device Client (e.g., the MVAG Device Client2 826), or to at least one MVAG Network Service (e.g., the MVAG Network Service 836), or to yet another MVVS Device Client 853. The PCP Admin Device 850 starts with acquiring the MVVS server Credentials and Client Credentials from the PCP 851. Afterwards, the MVVS server Credentials are sent to the MVAG Admin Device 820 to set to the MVAG 828 for connection with the corresponding MVVS 827, which is inside the VMS 832, which is inside the PCP 851. Further, there are at least three VPN tunnels binding together before the final two VPN tunnels forming a single VPN tunnel for the P2P communication between the MVVS Device Client1 825 and the MVAG MVVS Device Client1 826, the MVAG network service 836, or yet another MVVS smart device client (e.g., the MVVS Device Client3 853) in a vertical P2P private and secure MVVS smart device client application.

Figure 9:
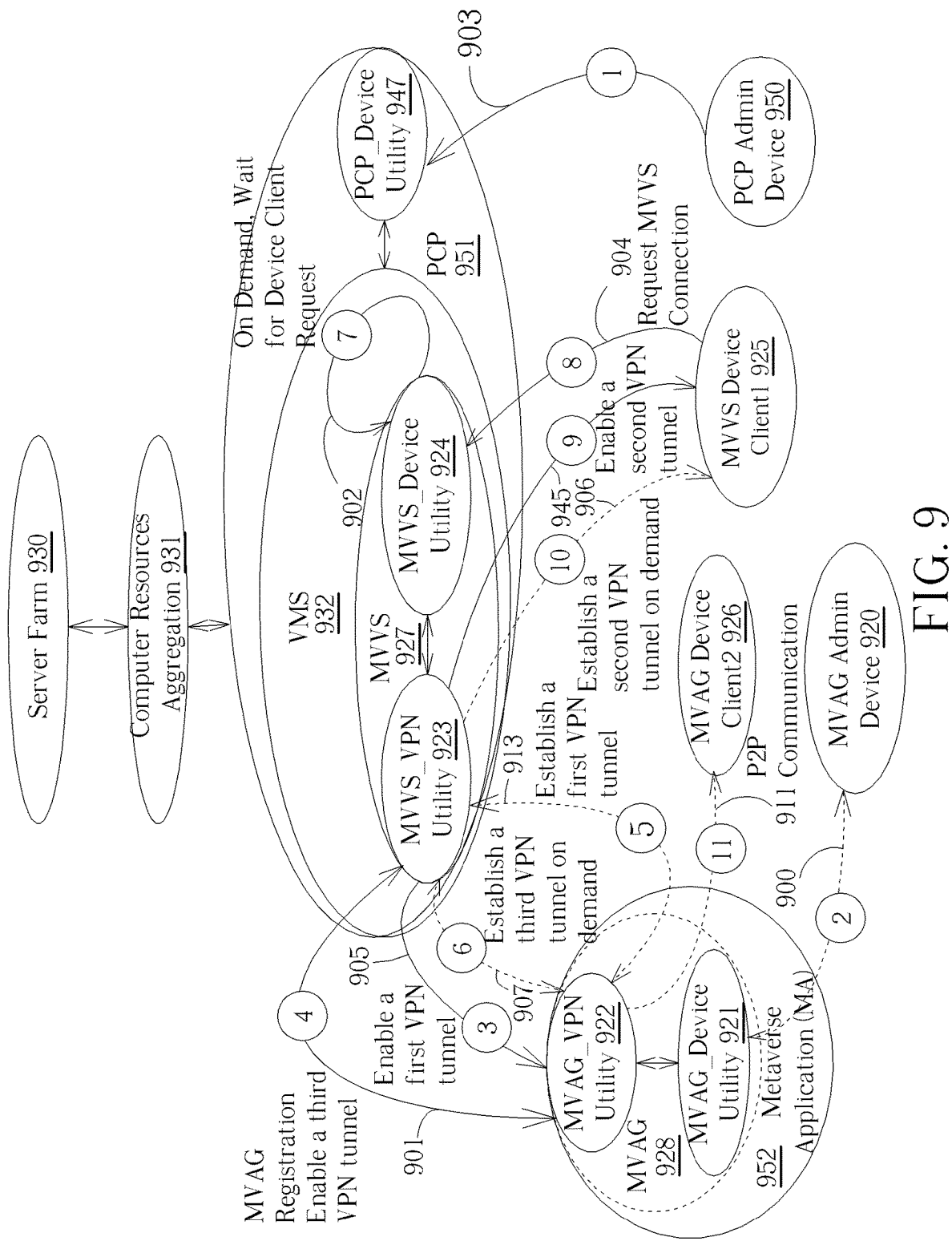
FIG. 9 is a diagram of a communication flow of P2P Connection Mechanism among MVAG, MVVS, MVVS smart device client, and a MVAG smart device client through a Cloud Network based on server farm, computer resources aggregation and VMS.

FIG. 9 is a diagram of a communication flow of P2P Connection Mechanism between MVAG, MVVS, a MVAG smart device client and a MVVS smart device client through a Cloud Network based on server farm, computer resources aggregation and virtual machine server. Further, FIG. 9 expands upon FIG. 8 by adding a server farm 930 and a computer resources aggregation 931 to exemplify the implementation of the MVAG connection mechanism in a hyperscale data center. The hyperscale data center may have at least one server farm (e.g., the server farm 930), at least one computer resources aggregation (e.g., the computer resources aggregation 931), at least one PCP (e.g., a CPC 951), and at least one VMS (e.g., a VMS 932). The VMS 932 is scalable in quantity and size. The hyperscale datacenter or the service provider may construct and deploy the at least one PCP (e.g., the CPC 951) and a large number of independent MVVS (e.g., a MVVS 927) in its corresponding VMSs (e.g., the VMS 932) in order to service its corresponding MVAG (e.g., a MVAG 928) and the corresponding MVAG smart device clients (e.g., a MVAG Device Client2 926). In essence, a community pair of P2P communication relationship between a MVVS Device Client1 925 (a MVVS smart device client) and the MVAG Device Client2 926 may be constructed and deployed by the metaverse provider who is responsible for maintaining the VMS 932 with or without the topology of the computer resources aggregation 931 and the server farm 930. A possible business model, for example, is for an Internet metaverse provider to offer to a large number of subscribers to host their private and secure MVVS 927 in the VMS 932. In addition, a separate private and secure MVAG 928 is also offered to allow the metaverse provider to install the MVAG 928 in their private LAN.

Through the invention, the metaverse subscriber may establish from anywhere, a P2P communication between its MVVS smart device client (e.g., the MVVS Device Client1 925), such as a smart phone, a tablet or a Tesla dashboard, and a MVAG smart device client (e.g., the MVAG Device Client2 926), such as a notebook (NB), IoT device, network attached storage (NAS), set-top-box (STB), smart appliance, or media server, residing on the metaverse provider's private and secure LAN. FIG. 9 shows in accordance with the present invention that no public cloud Routing Server is required for the MVVS smart device clients (e.g., the MVVS Device Client1 925) to connect and access to either the Server MVAG 928, MVVS 927, or another MVAG smart device client (e.g., the MVAG Device Client2 926), or the network services (not shown) under the server through the Cloud Network. As shown in FIG. 9, the MVVS Device Client1 925 and the MVAG 928 on the Cloud Network may communicate with each other without going through the Public Routing Server 112 or the Public VPN Routing Server 114 in FIG. 1. Initially, one of the MVVS Device Clients, a PCP Admin Device 950, connects to the PCP 951, which is a cloud-based public cloud portal, which contains a PCP_Device Utility 947, as in circle 1, 903. The PCP Admin Device 950 acquires MVVS server Credentials as well as MVVS client credentials from the PCP_Device Utility 947. The MVVS server Credentials include Domain_MVVS, the MVVS server domain, and Passcode_MVVS, the MVVS server passcode. The MVVS client credentials include MVVS client Profile, the client login profile file, and MVVS client Login, the login password of the client profile. The MVVS server Credentials are sent to a MVAG Admin Device 920 via email or other means. The MVVS client credentials are sent to authorized MVVS Device Clients, such as the MVVS Device Client1 925, for future P2P connection with one of the MVAG Device Clients, such as the MVAG Device Client2 926 on the private LAN of the MVAG 928. The PCP 951 contains at least one PCP_Device Utility (e.g., the PCP_Device Utility 947), which in turn contains the at least one VMS (e.g., the VMS 932), which in turn contains at least one MVVS (e.g., the MVVS 927), which in turn contains a MVVS_Device Utility 924 and a MVVS_VPN Utility 923. The VMS 932 along with the MVVS 927 forms a one-to-one corresponding relationship with the MVAG 928, deployed in the private LAN. The PCP_Device Utility 947 is a public cloud portal which is scalable and may correspond to the at least one VMS (e.g., the VMS 932) and the at least one MVVS (e.g., the MVVS 927).

The MVAG Admin Device 920, after receiving the MVVS server Credentials, first initializes and provisions the MVAG 928 with the server credentials through a MVAG_Device Utility 921, as described in circle 2, 900. The MVAG_Device Utility 921 then passes the info internally inside the MVAG 928, to a MVAG_VPN Utility 922. It then registers to the MVVS_VPN Utility 923 with the MVVS server credentials info that includes the Domain MVVS and Passcode_MVVS through the TCP/UDP protocols, as in circle 4, 901. After registration, the MVAG_VPN Utility 922 connects to the MVVS_VPN Utility 923 and enables a third VPN channel between the MVAG_VPN Utility 922 and the MVVS_VPN Utility 923. The MVVS_VPN Utility 923 then calls back to a MA 952, which contains at least one MVAG (e.g., the MVAG 928), which in turn contains the MVAG_VPN Utility 922 to enable a first VPN channel between the MVVS_VPN Utility 923 and the MVAG_VPN Utility 922, as in circle 3, 905. The MVVS_VPN Utility 923 can establish a third VPN tunnel on demand between the MVVS_VPN Utility 923 and the MVAG_VPN Utility 922, as in circle 6, 907. The MVVS_VPN Utility 923 can also establish a third VPN tunnel on demand between the MVVS_VPN Utility 923 and the MVAG_VPN Utility 922, pending the completion in establishing a second VPN tunnel on demand, as in circle 10, 906. Afterwards, the MVAG_VPN Utility 922 establishes a first VPN tunnel between the MVAG_VPN Utility 922 and the MVVS_VPN Utility 923, as in circle 5, 913. The MVVS_VPN Utility 923 also enables a second VPN channel between the MVVS_VPN Utility 923 and any MVVS Device Client (e.g., the MVVS Device Client1 925), as in circle 9, 945, from the cloud in the Internet. The MVVS 927 is then ready for further action on demand from any MVVS Device Client (e.g., the MVVS Device Client1 925) from the cloud in the Internet. The MVVS_VPN Utility 923 communicates with the MVVS_Device Utility 924, internally inside the MVVS 927. The MVVS Device Utility 924 stays in a loop waiting on demand for the MVVS smart device client request, as circle 7, 902. The MVVS Device Client1 925 first registers to the MVVS_Device Utility 924, with the MVVS client credentials, including the MVVS client Profile and MVVS client Login, as in circle 8, 904 or 914. The MVVS_Device Utility 924 passes the MVVS client credentials and the connection request internally inside the MVVS 927, to the MVVS_VPN Utility 923. After registration, the MVVS Device Client1 925 connects to the MVVS_VPN Utility 923 and establishes a second VPN tunnel on demand between the MVVS Device Client1 924 and the MVVS_VPN Utility 923, as in circle 10, 906 or 916. The MVVS_VPN Utility 923 then establishes a third VPN tunnel on demand between the MVVS_VPN Utility 923 and the MA 952, which contains at least one MVAG (e.g., the MVAG 928), which in turn contains the MVAG_VPN Utility 922, as in circle 6, 907. The second VPN tunnel on demand as in circle 10, 906 and the third VPN tunnel on demand as in circle 6, 907 are channeled into a single VPN between the MVVS_Device Client1 925 and the MVAG_VPN Utility 922 and in turn connecting to the MVAG Device Client2 926, as in circle 11, 911, or a MVAG Network Service (not shown) as in circle 11, 911.

Figure 10:
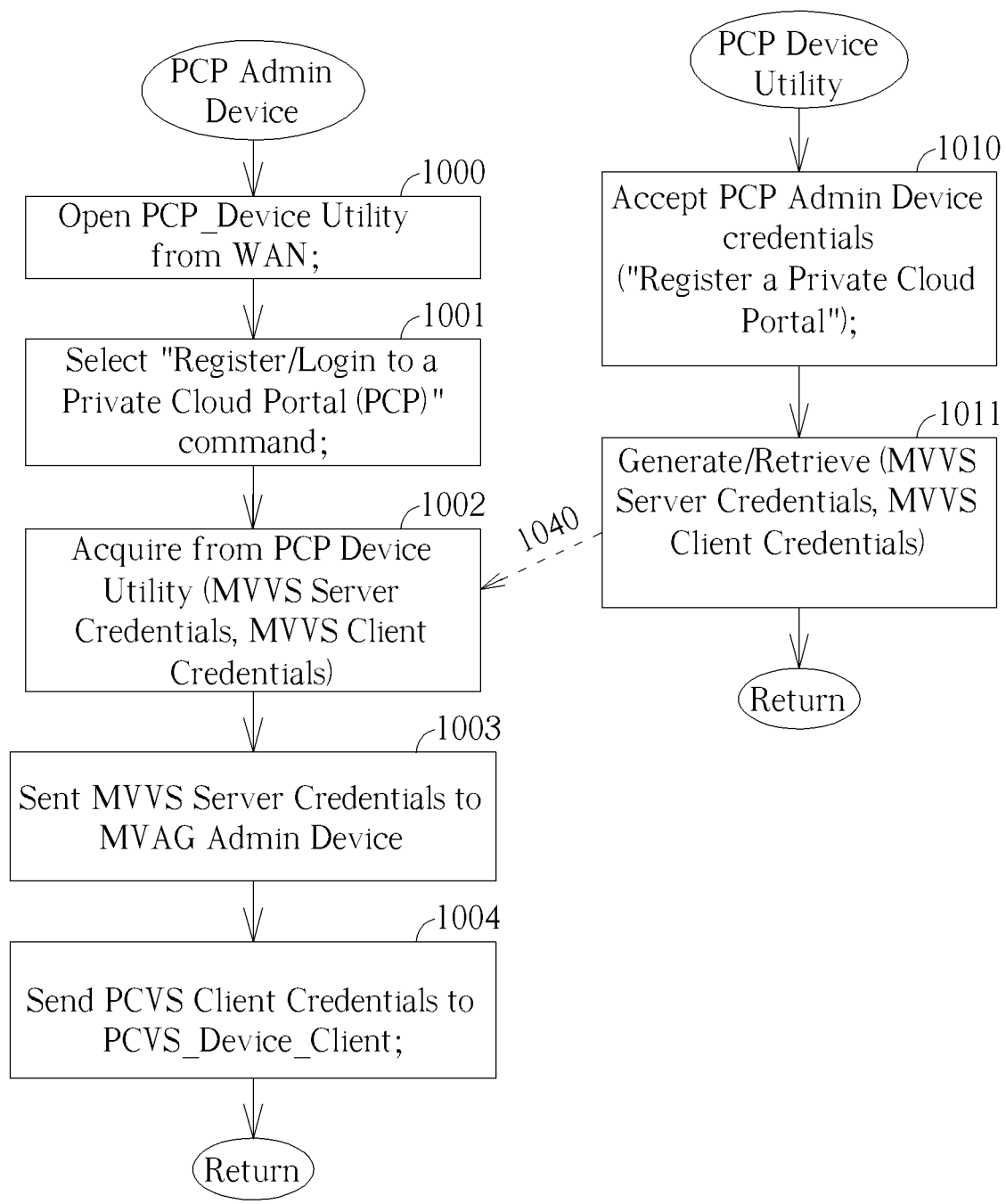
FIG. 10 shows the communication flow of Registering to a Public Cloud Portal by a PCP Admin Device in accordance with the present invention.

FIG. 10 shows the communication flow of Registering to a Public Cloud Portal by a PCP Admin Device in accordance with the present invention. The PCP Admin Device first opens the PCP Device Utility from the WAN, via step 1000. Next, "Register a Public Cloud Portal" command on the PCP Device Utility is selected, via step 1001. Next, the MVVS server Credentials as well as the MVVS client credentials are acquired, via step 1002. The MVVS server Credentials contains the MVVS server domain, Domain_MVVS, and the server passcode, Password_MVVS. The MVVS client credentials contain the MVVS client Profile and the MVVS client Login. Next, the MVVS server Credentials including the Domain MVVS and the Password_MVVS are sent to the MVAG Admin Device, via step 1003. The MVVS client credentials including MVVS client Profile and the MVVS client Login are sent to the MVVS_Device Client, via step 1004, for future P2P communication with the targeted MVAG Device Clients, MVAG Network Service, or another MVVS Device Client.

In the meantime, the PCP_Device Utility starts accepting command from PCP Admin Device to register to the PCP, via step 1010. The MVVS server Credentials and the MVVS client credentials are either generated or retrieved by the PCP_Device Utility, via step 1011. Both credentials are then sent back to the PCP Admin Device, via step 1040.

Figure 11:
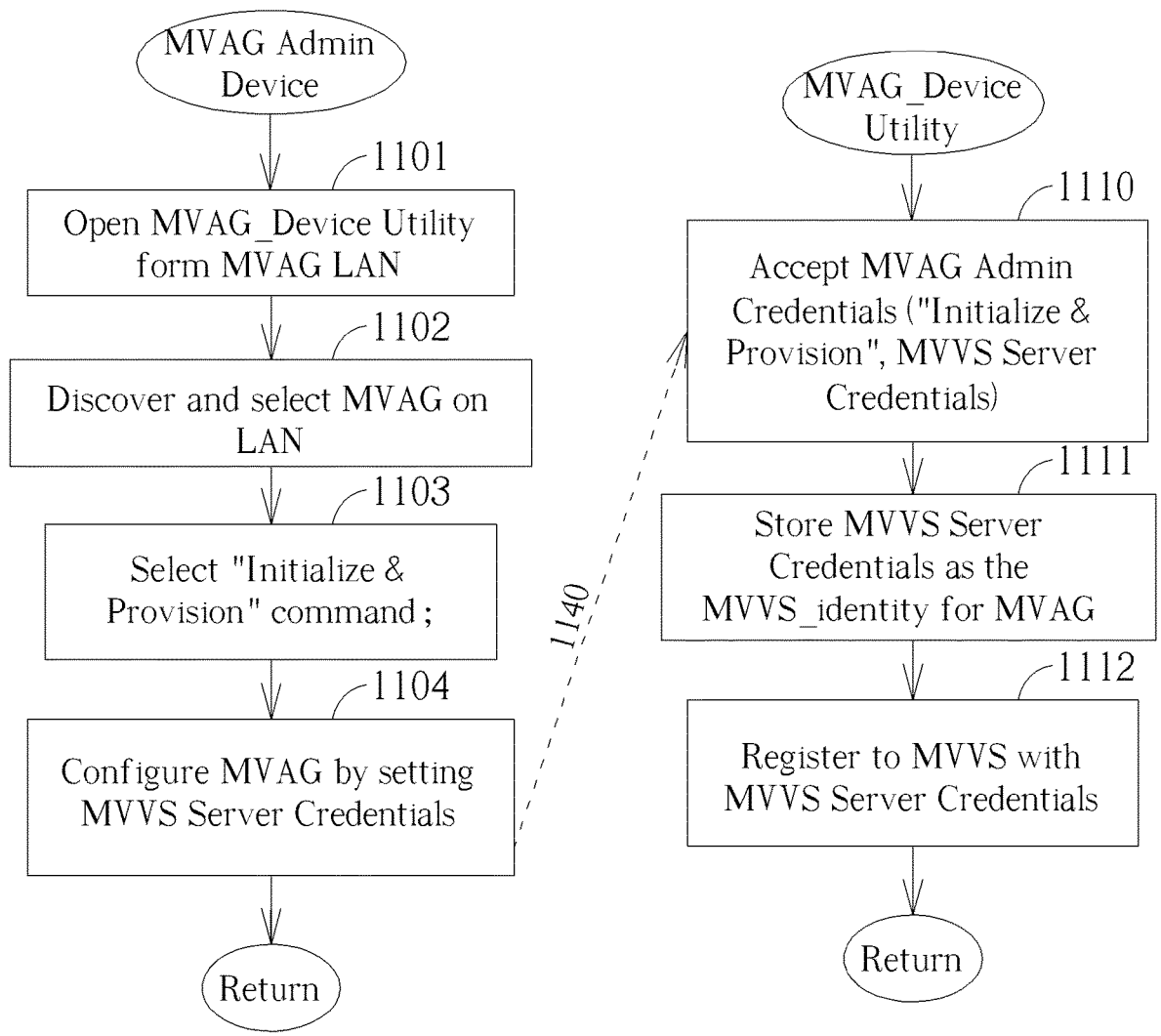
FIG. 11 shows the communication flow of Initializing and Provisioning of the MVAG by MVAG Admin Device in accordance with the present invention.

FIG. 11 shows the communication flow of the Initializing and Provisioning of the MVAG by the MVAG Admin Device in accordance with the present invention. As shown in FIG. 11, the MVAG Admin Device first opens MVAG_Device Utility from MVAG LAN, via step 1101. Thereafter, discover and select MVAG on LAN, via step 1102. Then the "Initialize and Provision" command on MVAG_Device Utility is selected, via step 1103. Thereafter, the MVAG is configured by setting MVVS server Credentials, including the MVVS server domain, Domain MVVS, and the MVVS server passcode, Passcode_MVVS, as the unique MVAG identity, via step 1104. The MVVS server Credentials are then sent to MVAG_Device Utility, via step 1140.

The MVVS server Credentials (Domain_MVVS, Passcode_MVVS) are the accepted, via step 1110, and stored as the identity for MVAG, via step 1111. Then the MVAG is registered to a MVVS as a corresponding client, via step 1112.

Figure 12:
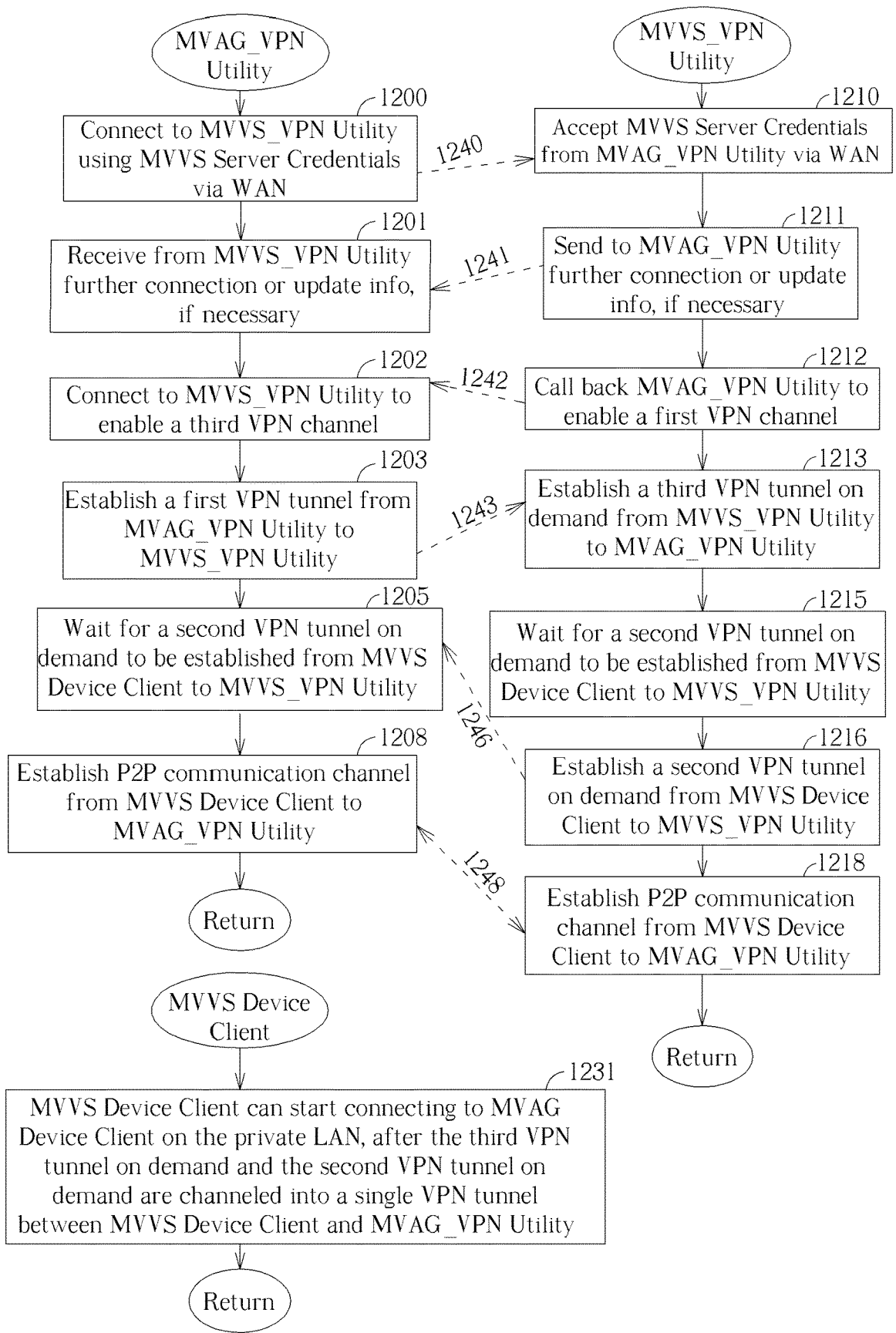
FIG. 12 shows the communication flow of Connection from the MVVS_VPN Utility to the MVAG_VPN Utility and the connection between a MVVS Device Client and a MVAG Device Client on a private LAN in accordance with the present invention.

FIG. 12 shows the communication flow of Connection from the MVVS_VPN Utility to the MVAG_VPN Utility and the connection between a MVVS Device Client and a MVAG Device Client on a private LAN in accordance with the present invention. The MVAG_VPN Utility first connects to MVVS_VPN Utility using MVVS server Credentials via WAN, via step 1200. The MVVS_VPN Utility accepts MVVS server Credentials from MVAG_VPN Utility via WAN, via step 1210. Next, the MVVS_VPN Utility sends to MVAG_VPN Utility further connection or update info, if necessary, via step 1211 and 1241. The MVAG_VPN Utility then receives from MVVS_VPN Utility further connection or update info, if necessary, via step 1201. Next, the MVVS_VPN Utility calls back MVAG_VPN Utility to enable a first VPN channel, via steps 1212 and 1242. Then, the MVAG_VPN Utility connects to MVVS_VPN Utility to enable a third VPN channel, via step 1202. Next, the MVAG_VPN Utility connects to MVVS_VPN Utility to establish a first VPN tunnel from MVAG_VPN Utility to MVVS_VPN Utility, via steps 1203 and 1243. Then, the MVVS_VPN Utility establishes a third VPN tunnel from MVVS_VPN Utility to MVAG_VPN Utility, via step 1213. Next, the MVVS_VPN Utility waits for a second VPN tunnel on demand to be established from MVVS Device Client to MVVS_VPN Utility, via step 1215. Then, the MVVS_VPN Utility establishes a second VPN tunnel on demand from MVVS Device Client to MVVS_VPN Utility, via steps 1216 and 1246. Next, the MVAG_VPN Utility waits for a second VPN tunnel on demand to be established from MVVS Device Client to MVVS_VPN Utility, via step 1205. Then, the MVAG_VPN Utility establishes P2P communication channel from MVVS Device Client to MVAG_VPN Utility, via steps 1208 and 1248. Then, the MVVS_VPN Utility establishes P2P communication channel from MVVS Device Client to MVAG_VPN Utility, via step 1218. After this point, the second VPN tunnel on demand and the third VPN tunnel on demand are channeled into a single VPN tunnel between MVVS Device Client and MVAG_VPN Utility. The MVVS Device Client can then start private and secure connection to at least one MVAG Device Client, or the MVAG Network Service (not shown) on the private MVAG LAN, or another MVVS Device Client (not shown) on the public cloud in the Internet, after the third VPN tunnel on demand and the second VPN tunnel on demand are channeled into a single VPN tunnel between MVVS Device Client and MVAG_VPN Utility, via step 1231.

Compared with the third embodiment, the first embodiment has the benefits of a true connection on demand mechanism between the MVVS Device Client and the MVVS VPN Utility via the second VPN tunnel on demand; and between the MVVS VPN Utility and the MVAG_VPN Utility, and ultimately to the MVAG device clients, via the third VPN tunnel on demand. On the surface, it appears to be more secure than the third embodiment. But due to the commonality of applying the second VPN tunnel on demand, both in the first embodiment and the third embodiment, the final single VPN channel in both embodiments are as secure from the nature of the VPN connection mechanism. The first embodiment can offer a true on demand VPN connection due to its complexity in applying a third VPN tunnel on demand, which is to combine with the second VPN tunnel on demand to channel into a single VPN channel between the MVVS Device Client and the MVAG_VPN Utility, and ultimately to the MVAG device clients. Its architecture is more complex by utilizing three VPN tunnels, instead of two VPN tunnels in the third embodiment. The first embodiment does not require the third VPN tunnel to be on all the time, or to have to keep it alive all the time. It is therefore consuming less energy in the nature of the on-demand connection mechanism. It may appear that by doing so, it is more secure from the on-demand nature of the third VPN tunnel. But the fact is that the connection mechanism from the second VPN tunnel on demand has more than addressed the security concern in the ultimate single VPN channel between the MVVS Device Client and the MVAG_VPN Utility. In terms of connection simplicity, efficiency, and security, the third embodiment is therefore a preferred embodiment.

Figure 13:
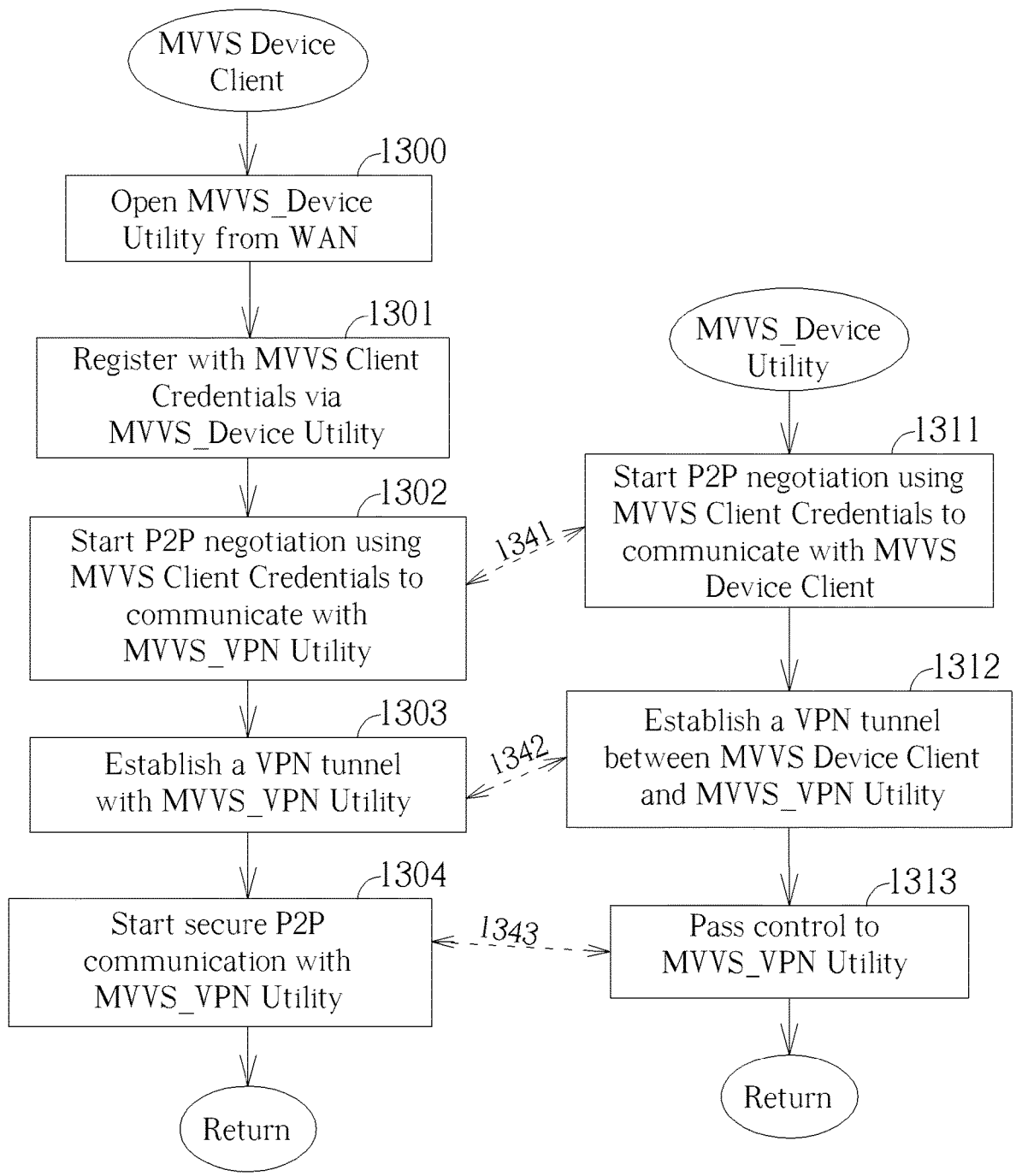
FIG. 13 shows the communication flow of the Metaverse VPN server by MVVS Device Client in accordance with the present invention.

FIG. 13 shows the communication flow of the Metaverse VPN server by MVVS Device Client in accordance with the present invention. From the MVVS Device Client standpoint, the MVVS_Device Utility is open from the WAN, via step 1300. Next, the MVVS Device Client registers with the MVVS_Device Utility with MVVS client credentials including MVVS client Profile and MVVS client Login, via step 1301. Next, it starts P2P negotiation using MVVS client credentials to communicate with MVVS_VPN Utility, via steps 1302 and 1341. The corresponding MVVS_Device Utility also starts P2P negotiation using MVVS client credentials to communicate with MVVS Device Client, via step 1311. Next, a VPN tunnel between MVVS Device Client and the MVVSD_VPN Utility is established, via steps 1303, 1312, and 1342. The MVVS Device Client then starts secure P2P communication with MVVS_VPN Utility, via steps 1304 and 1343. On the side of MVVS_Device Utility, it passes control to MVVS_VPN Utility, via step 1313.

Figure 14:
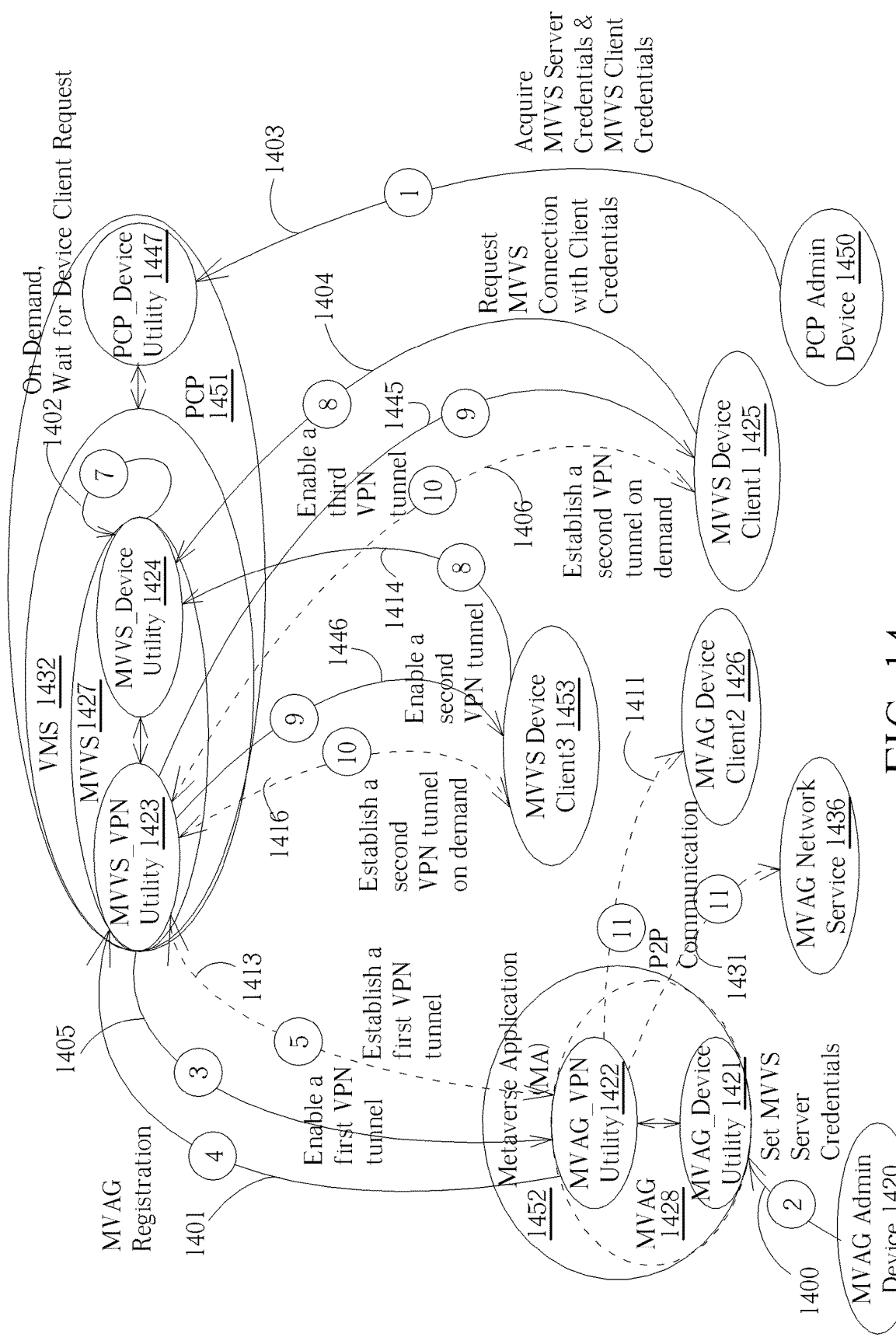
FIG. 14 is a diagram of a third embodiment of a communication flow of P2P Connection Mechanism among MVAG, MVVS, MVVS smart device client, and a MVAG smart device client through a Cloud Network.

FIG. 14 is a diagram of a communication flow of a third embodiment of P2P Connection Mechanism between MVAG, MVVS, a MVAG smart device client and a MVVS smart device client through a Cloud Network. It shows in accordance to the present invention that no public cloud Routing Server is required for the MVVS smart device clients to connect and access to either the Server MVAG 1428, MVVS 1427, or another MVAG smart device client, or the network services under the server through Cloud Network. As shown in FIG. 14, a MVVS Device Client1 1425 and a MVAG 1428 on the Cloud Network can communicate with each other without going through the Public Routing Server 112 or the Public VPN Routing Server 114 in FIG. 1. Unlike the prior art in FIG. 7, initially, one of the MVVS Device Clients, a PCP Admin Device 1450, connects to a PCP 1451, which is a cloud-based public cloud portal, which contains a PCP_Device Utility 1447, as in circle 1,

1403. The PCP Admin Device 1450 acquires MVVS server Credentials as well as MVVS client credentials from the PCP_Device Utility 1447. The MVVS server Credentials include Domain_MVVS, the MVVS server domain, and Passcode_MVVS, the MVVS server passcode. The MVVS client credentials include MVVS client Profile, the client login profile file, and MVVS client Login, the login password of the client profile. The MVVS server Credentials are sent to a MVAG Admin Device 1420 via email or other means. The MVVS client credentials are sent to authorized MVVS Device Clients, such as the MVVS Device Client1 1425, for future P2P connection with one of the MVAG Device Clients, such as a MVAG Device Client2 1426 on the private LAN of the MVAG 1428. The PCP 1451 contains at least one PCP_Device Utility (e.g., the PCP_Device Utility 1447), which in turn contains at least one VMS (e.g., a VMS 1432), which in turn contains at least one MVVS (e.g., a MVVS 1427), which in turn contains a MVVS_Device Utility 1424 and a MVVS_VPN Utility 1423. The VMS 1432 along with the MVVS 1427 forms a one-to-one corresponding relationship with the MVAG 1428, deployed in the private LAN. The PCP_Device Utility 1447 is a public cloud portal which is scalable and may correspond to the at least one VMS (e.g., the VMS 1432) and the at least one MVVS (e.g., the MVVS 1427).

The MVAG Admin Device 1420, after receiving the MVVS server Credentials, first initializes and provisions the MVAG 1428 with the server credentials through a MVAG_Device Utility 1421, as described in circle 2, 1400. The MVAG_Device Utility 1421 then passes the info internally inside the MVAG 1428, to a MVAG_VPN Utility 1422. It then registers to the MVVS_VPN Utility 1423 with the MVVS server credentials info that includes the Domain MVVS and Passcode_MVVS through the TCP/UDP protocols, as in circle 4, 1401. The MVVS_VPN Utility 1423 then calls back to a MA 1452, which contains at least one MVAG (e.g., the MVAG 1428), which in turn contains the MVAG_VPN Utility 1422 to enable a first VPN channel between the MVVS_VPN Utility 1423 and the MVAG_VPN Utility 1422, as in circle 3, 1405. Afterwards, the MVAG_VPN Utility 1422 establishes a first VPN tunnel between the MVAG_VPN Utility 1422 and the MVVS_VPN Utility 1423, as in circle 5, 1413. The MVVS_VPN Utility 1423 also enables a second VPN channel between the MVVS_VPN Utility 1423 and any MVVS Device Client (e.g., the MVVS Device Client1 1425 or a CVS Device Client3 1453), as in circle 9, 1445 or 1446, from the cloud in the Internet. The MVVS 1427 is then ready for further action on demand from any MVVS Device Client (e.g., the MVVS Device Client1 1425) from the cloud in the Internet. The MVVS_VPN Utility 1423 communicates with the MVVS_Device Utility 1424, internally inside the MVVS 1427. The MVVS_Device Utility 1424 stays in a loop waiting on demand for the MVVS smart device client request, as circle 7, 1402. The MVVS Device Client1 1425 first registers to the MVVS_Device Utility 1424, with the MVVS client credentials, including the MVVS client Profile and MVVS client Login, as in circle 8, 1404 or 1414. The MVVS_Device Utility 1424 passes the MVVS client credentials and the connection request internally inside the MVVS 1427, to the MVVS_VPN Utility 1423. After registration, the MVVS Device Client1 1425 connects to the MVVS_VPN Utility 1423 and establishes a second VPN tunnel on demand between the MVVS Device Client1 1425 and the MVVS_VPN Utility 1423, as in circle 10, 1406 or 1416. The second VPN tunnel on demand as in circle 10, 1406 and the first VPN tunnel as in circle 5, 1413 are channeled into a single VPN between the MVVS Device Client1 1425 and the MVAG_VPN Utility 1422 and in turn connecting to a MVAG Device Client2 1426, as in circle 11, 1411, or a MVAG Network Service 1436 as in circle 11, 1431, or yet another MVVS Device Client (e.g., the MVVS Device Client3 1453) as in circle 10, 1416, assuming another MVVS Device Client (e.g., the MVVS Device Client3 1453) has also successfully connected to the MVVS_VPN Utility 1423. The MVVS Device Client1 1425 and the MVVS Device Client3 1453 therefore form a P2P private and secure communication channel between them, which is the foundation for further secure chat applications in text, audio, and video, including crypto currency transaction.

Compared with the prior art in FIG. 7, the present invention is more scalable and expandable, as it introduces a few new entities, including the PCP 1451, the PCP_Device Utility 1447, the VMS 1432, the MA 1452, the PCP Admin Devices 1450, the MVAG Admin Device 1420, the MVVS server Credentials, and the MVVS client credentials. It connects first to the PCP 1451, then to at least one PCP_Device Utility (e.g., the PCP_Device Utility 1447), then to the at least one VMS (e.g., the VMS 1432), then to the at least one MVVS (e.g., the MVVS 1427), then to at least one MA (e.g., the MA 1452), then to the at least one MVAG (e.g., the MVAG 1428), then to at least one MVAG Device Client (e.g., the MVAG Device Client2 1426), or to at least one MVAG Network Service (e.g., the MVAG Network Service 1436), or to yet another MVVS Device Client (e.g., the MVVS Device Client3 1453). The PCP Admin Device 1450 starts with acquiring the MVVS server Credentials and Client Credentials from the PCP 1451. Afterwards, the MVVS server Credentials are sent to the MVAG Admin Device 1420 to set to the MVAG 1428 for connection with the corresponding MVVS 1427, which is inside the VMS 1432, which is inside the PCP 1451. Further, there are at least three VPN tunnels binding together before the final two VPN tunnels forming a single VPN tunnel for the peer-to-peer communication between a MVVS smart device client 1425 and a MVAG smart device client 1426, the MVAG Network Service 1436, or yet another MVVS smart device client (e.g., the MVVS Device Client3 1453) in a vertical P2P private and secure MVVS smart device client application.

Figure 15:
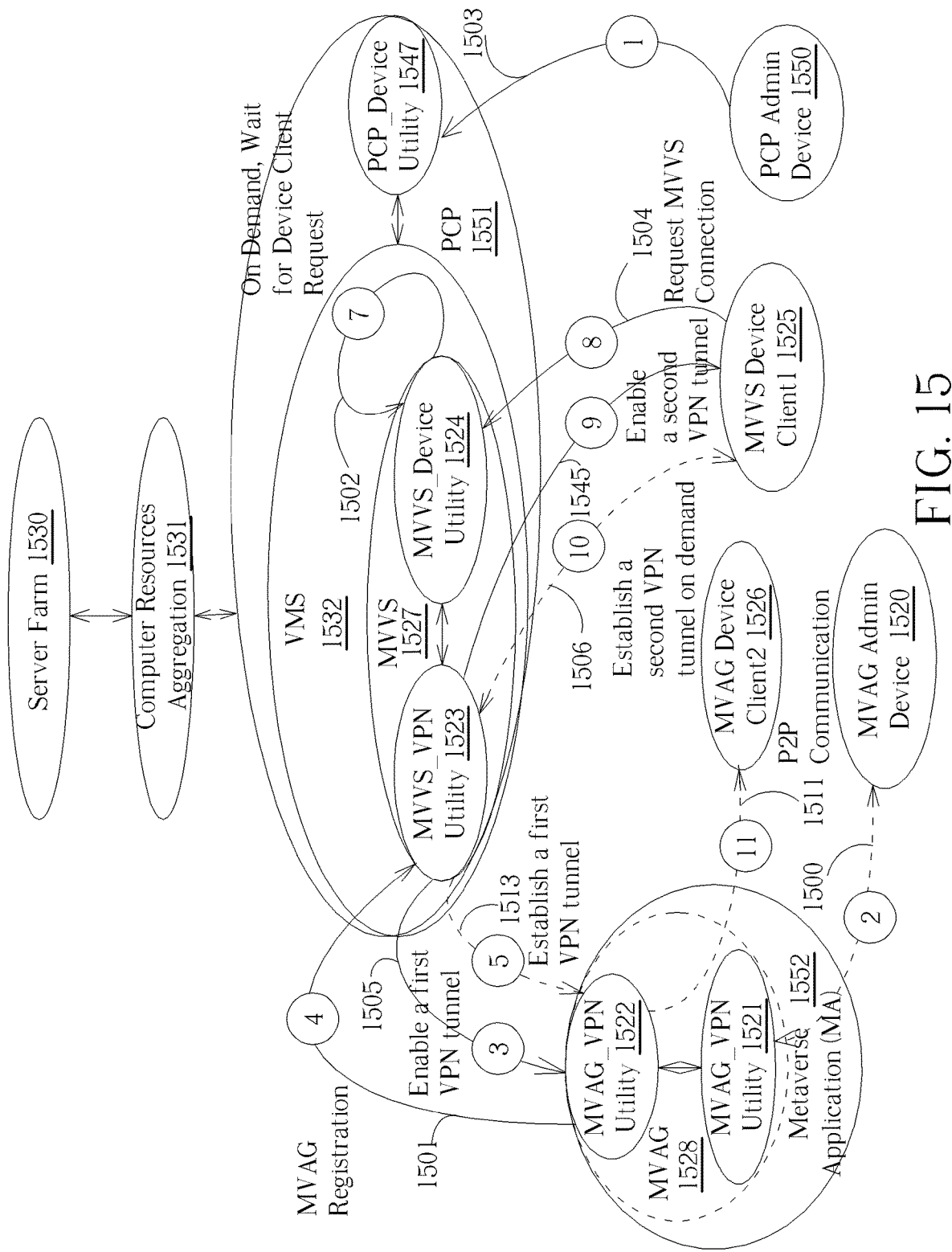
FIG. 15 is a diagram of a third embodiment of a communication flow of P2P Connection Mechanism among MVAG, MVVS, MVVS smart device client, and a MVAG smart device client through a Cloud Network based on server farm, computer resources aggregation and virtual machine server.

FIG. 15 is a diagram of a communication flow of a third embodiment of P2P Connection Mechanism between MVAG, MVVS, a MVAG smart device client and a MVVS smart device client through a Cloud Network based on server farm, computer resources aggregation and virtual machine server. Further, FIG. 15 expands upon FIG. 14 by adding a server farm 1530 and a computer resources aggregation 1531 to exemplify the implementation of the MVAG connection mechanism in a hyperscale data center. The hyperscale data center may have at least one server farm (e.g., the server farm 1530), at least one computer resources aggregation (e.g., the computer resources aggregation 1531), at least one PCP (e.g., a PCP 1551), and at least one VMS (e.g., a VMS 1532). The VMS 1532 is scalable in quantity and size. The hyperscale datacenter or the service provider may construct and deploy at least one PCP (e.g., a PCP 1551) and a large number of independent MVVS (e.g., a MVVS 1527) in its corresponding VMSs (e.g., the VMS 1532) in order to service its corresponding MVAG (e.g., a MVAG 1528) and the corresponding MVAG smart device clients (e.g., a MVAG Device Client2 1526). In essence, a community pair of P2P communication relationship between the MVVS smart device client (e.g., a MVVS Device Client1 1525) and the MVAG smart device client (e.g., the MVAG Device Client2 1526) may be constructed and deployed by the metaverse provider who is responsible for maintaining the VMS 1532 with or without the topology of the computer resources aggregation 1531 and the server farm 1530. A possible business model, for example, is for an Internet metaverse provider to offer to a large number of subscribers to host their private and secure MVVS 1527 in the VMS 1532. In addition, a separate private and secure MVAG 1528 is also offered to allow the metaverse provider to install the MVAG 1528 in their private LAN. Through the invention, the metaverse subscriber may establish from anywhere, a P2P communication between its MVVS smart device client (e.g., the MVVS Device Client1 1525), such as a smart phone, a tablet or a Tesla dashboard, and a MVAG smart device client e.g., the MVAG Device Client2 1526), such as a NB, IoT device, NAS, STB, smart appliance, or media server, residing on the metaverse provider's private and secure LAN. FIG. 15 shows in accordance with the present invention that no public cloud Routing Server is required for the MVVS smart device clients (e.g., the MVVS Device Client1 1525) to connect and access to either the Server MVAG 1528, MVVS 1527, or another MVAG smart device client (e.g., the MVAG Device Client2 1526), or the network services (not shown) under the server through the Cloud Network. As shown in FIG. 15, the MVVS Device Client1 1525 and the MVAG 1528 on the Cloud Network may communicate with each other without going through the Public Routing Server 112 or the Public VPN Routing Server 114 in FIG. 1 (not shown). Initially, one of the MVVS Device Clients, a PCP Admin Device 1550, connects to the PCP 1551, which is a cloud-based public cloud portal, which contains a PCP_Device Utility 1547, as in circle 1, 1503. The PCP Admin Device 1550 acquires MVVS server Credentials as well as MVVS client credentials from the PCP_Device Utility 1547. The MVVS server Credentials include Domain MVVS, the MVVS server domain, and Passcode_MVVS, the MVVS server passcode. The MVVS client credentials include MVVS client Profile, the client login profile file, and MVVS client Login, the login password of the client profile. The MVVS server Credentials are sent to a MVAG Admin Device 1520 via email or other means. The MVVS client credentials are sent to authorized MVVS Device Clients, such as the MVVS Device Client1 1525, for future P2P connection with one of the MVAG Device Clients, such as the MVAG Device Client2 1520 on the private LAN of the MVAG 1528. The PCP 1551 contains at least one PCP_Device Utility (e.g., a PCP_Device Utility 1547), which in turn contains the at least one VMS (e.g., the VMS 1532), which in turn contains at least one MVVS (e.g., the MVVS 1527), which in turn contains a MVVS_Device Utility 1524 and a MVVS_VPN Utility 1523. The VMS 1532 along with the MVVS 1527 forms a one-to-one corresponding relationship with the MVAG 1528, deployed in the private LAN. The PCP_Device Utility 1547 is a public cloud portal which is scalable and may correspond to the at least one VMS (e.g., the VMS 1532) and the at least one MVVS (e.g., the MVVS 1527).

The MVAG Admin Device 1520, after receiving the MVVS server Credentials, first initializes and provisions the MVAG 1528 with the server credentials through the MVAG_Device Utility 1521, as described in circle 2, 1500. The MVAG_Device Utility 1521 then passes the info internally inside the MVAG 1528, to a MVAG_VPN Utility 1522. It then registers to the MVVS_VPN Utility 1523 with the MVVS server credentials info that includes the Domain MVVS and Passcode_MVVS through the TCP/UDP protocols, as in circle 4, 1501. After registration, the MVVS_VPN Utility 1523 then calls back to a MA 1552, which contains at least one MVAG (e.g., the MVAG 1528), which in turn contains the MVAG_VPN Utility 1522 to enable a first VPN channel between the MVVS_VPN Utility 1523 and the MVAG_VPN Utility 1522, as in circle 3, 1505. The MVVS_VPN Utility 1523 can also establish a second VPN tunnel on demand between the MVVS_VPN Utility 1523 and the MVAG_VPN Utility 1522, pending the completion in establishing a second VPN tunnel on demand, as in circle 10, 1506. Afterwards, the MVAG_VPN Utility 1522 establishes a first VPN tunnel between the MVAG_VPN Utility 1522 and the MVVS_VPN Utility 1523, as in circle 5, 1513. The MVVS_VPN Utility 1523 also enables a second VPN channel between the MVVS_VPN Utility 1523 and any MVVS Device Client (e.g., the MVVS Device Client1 1525), as in circle 9, 1545, from the cloud in the Internet. The MVVS 1527 is then ready for further action on demand from any MVVS Device Client (e.g., the MVVS Device Client1 1525) from the cloud in the Internet. The MVVS_VPN Utility 1523 communicates with the MVVS_Device Utility 1524, internally inside the MVVS 1527. The MVVS_Device Utility stays in a loop waiting on demand for the MVVS smart device client request, as circle 7, 1502. The MVVS Device Client1 1525 first registers to the MVVS_Device Utility 1524, with the MVVS client credentials, including the MVVS client Profile and MVVS client Login, as in circle 8, 1504. The MVVS_Device Utility 1524 passes the MVVS client credentials and the connection request internally inside the MVVS 1527, to the MVVS_VPN Utility 1523. After registration, the MVVS Device Client1 1525 connects to the MVVS_VPN Utility 1523 and establishes a second VPN tunnel on demand between the MVVS Device Client1 1525 and the MVVS_VPN Utility 1523, as in circle 10, 1506. The second VPN tunnel on demand as in circle 10, 1506 and the first VPN tunnel as in circle 5, 1513 are channeled into a single VPN between the MVVS_Device Client1 1525 and the MVAG_VPN Utility 1522 and in turn connecting to the MVAG Device Client2 1526, as in circle 11, 1511, or a MVAG Network Service (not shown) as in circle 11, 1511.

Figure 16:
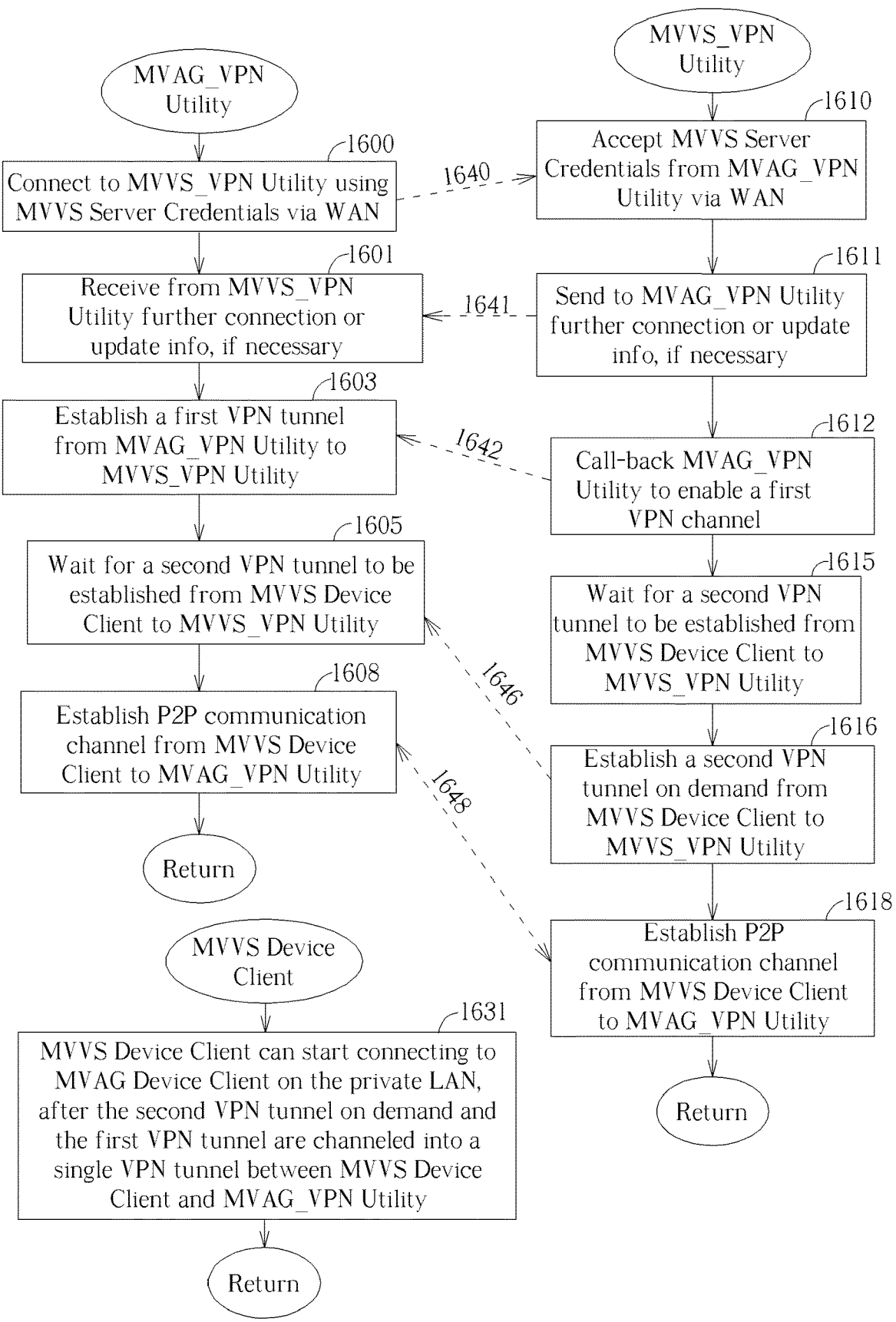
FIG. 16 shows the communication flow of a third embodiment of Connection from the MVVS_VPN Utility to the MVAG_VPN Utility and the connection between a MVVS Device Client and a MVAG Device Client on a private LAN in accordance with the present invention.

FIG. 16 shows the communication flow of a third embodiment of Connection from the MVVS_VPN Utility to the MVAG_VPN Utility and the connection between a MVVS Device Client and a MVAG Device Client on a private LAN in accordance with the present invention. The MVAG_VPN Utility first connects to MVVS_VPN Utility using MVVS server Credentials via WAN, via step 1600. The MVVS_VPN Utility accepts MVVS server Credentials from MVAG_VPN Utility via WAN, via step 1610. Next, the MVVS_VPN Utility sends to MVAG_VPN Utility further connection or update info, if necessary, via steps 1611 and 1641. The MVAG_VPN Utility then receives from MVVS_VPN Utility further connection or update info, if necessary, via step 1601. Next, the MVVS_VPN Utility calls back MVAG_VPN Utility to enable a first VPN channel, via steps 1612 and 1642. Next, the MVAG_VPN Utility connects to MVVS_VPN Utility to establish a first VPN tunnel from MVAG_VPN Utility to MVVS_VPN Utility, via steps 1603 and 1642. Next, the MVVS_VPN Utility waits for the second VPN tunnel to be established from MVVS Device Client to MVVS_VPN Utility, via step 1615. Then, the MVVS_VPN Utility establishes a second VPN tunnel on demand from MVVS Device Client to MVVS_VPN Utility, via steps 1616 and 1646. Next, the MVAG_VPN Utility waits for the second VPN tunnel to be established from MVVS Device Client to MVVS_VPN Utility, via step 1605.

Then, the MVAG_VPN Utility establishes P2P communication channel from MVVS Device Client to MVAG_VPN Utility, via step 1608, 1618 and 1648. After this point, the second VPN tunnel and the first VPN tunnel are channeled into a single VPN tunnel between MVVS Device Client and MVAG_VPN Utility. The MVVS Device Client can then start private and secure connection to at least one MVAG Device Client, or the MVAG Network Service (not shown) on the private MVAG LAN, or another MVVS_Device Client (not shown) on the public cloud in the Internet, after the second VPN tunnel on demand and the first VPN tunnel are channeled into a single VPN tunnel between MVVS Device Client and MVAG_VPN Utility, via step 1631, Compared with the first embodiment, the third embodiment has the benefits of a simpler architecture by utilizing only two VPN tunnels, instead of three VPN tunnels from the first embodiment. But the third embodiment requires the first VPN tunnel to be on all the time, or at least to have to keep alive all the time. It may appear that by doing so, it is less secure from the always-on nature of the first VPN tunnel. But the fact is that the connection mechanism from the second VPN tunnel on demand has more than addressed the security concern in the ultimate single VPN channel between MVVS Device Client and MVAG_VPN Utility. In terms of connection simplicity, efficiency, and security, the third embodiment is therefore a preferred embodiment.

Most of the content providers, such as Netflix, HBO, Amazon, Pandora, and others, enforce a mechanism called geo-blocking to enforce their exclusive digital territorial rights. In contrast, geo-home is a mechanism for allowing access to the online content at home, while geo-portal is a mechanism for allowing access to the online content at the portal. Although the legality of the enforcement of geo-blocking is controversial and is interpreted differently from regions to regions, some of the international travelers employ VPN relay services to circumvent IP-based geo-blocks, in order to access home or foreign based online content that are not available from outside the country they are in. The downside of this practice, other than legality, is that it involves additional subscription to the VPN service and the limited selections by choosing either geo-home or geo-portal. The present invention provides a mechanism for the metaverse provider to dynamically configure MVVS on demand to flexibly offer to the users on the choices among geo-blocking, geo-portal, or geo-home in accessing the on-line content, in addition to the original features in allowing the private and secure access to the MVAG device clients and network services in the private LAN from anywhere in the cloud through Internet.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for a connection mechanism in a public cloud network, the method comprising:

setting up at least one public cloud portal (PCP), at least one virtual machine server (VMS), at least one PCP Admin Device, at least one metaverse virtual private network (VPN) server (MVVS), at least one VPN tunnel, and at least one MVVS smart device client on a side of the at least one MVVS to provide a plurality of cloud-based web services, at least one metaverse application (MA) which includes at least one private router, at least one private local area network (LAN), at least one metaverse app gateway (MVAG), at least one MVAG Admin Device, at least one MVAG network service, and at least one MVAG smart device client on a side of a MVAG private LAN in a client server relationship;

acquiring a plurality of connection credentials from a PCP Admin Device of the at least one PCP Admin Device;

pairing and registration with a MVVS of the at least one MVVS from a MVAG of the at least one MVAG;

establishing a plurality of initial VPN tunnels between the MVVS and the MVAG;

connecting to the MVAG on demand between a MVVS smart device client of the at least one MVVS smart device client and the MVAG through the MVVS; and running a plurality of vertical peer-to-peer (P2P) private and secure MVVS smart device client applications between the at least one MVVS smart device client and one of the at least one MVAG smart device client, the at least one MVAG network service and another MVVS smart device client;

wherein the connection mechanism is a P2P private and secure connection mechanism between the at least one MVVS smart device client and at least one of the MVAG, the at least one MVAG smart device client, the at least one MVAG network service or the another MVVS smart device client;

wherein the at least one PCP and the at least one VMS which includes the at least one MVVS reside in a hyperscale data center located on the public cloud network;

wherein the at least one MA along with the at least one MVAG reside in a plurality of metaverse provider's application environments.

2. The method of claim 1, wherein the plurality of connection credentials include a plurality of MVVS server credentials and a plurality of MVVS client credentials.

3. The method of claim 2, wherein the at least one PCP is accessed by the at least one PCP Admin Device to log in and acquire the plurality of MVVS server credentials and the plurality of MVVS client credentials.

4. The method of claim 2, wherein the plurality of MVVS server credentials are sent to a MVAG Admin Device of the at least one MVAG Admin Device, and the plurality of MVVS client credentials are sent to the MVVS smart device client for a connection.

5. The method of claim 2, wherein the plurality of MVVS server credentials include a MVVS virtual machine server domain name and a MVVS virtual machine server login passcode, and the plurality of MVVS client credentials include a MVVS smart device client VPN profile file and a MVVS smart device client VPN login password.

6. The method of claim 2, wherein the plurality of MVVS server credentials are imported by a MVAG Admin Device of the at least one MVAG Admin Device to set into the MVAG in order for the MVAG to pair and register with the MVVS.

7. The method of claim 1, wherein the step of establishing the plurality of initial VPN tunnels between the MVVS and the MVAG comprises:
   calling back, by the at least one MVVS in the public cloud network, the at least one MVAG in a private LAN of the at least one MA to enable a first VPN channel;
   establishing, by the at least one MVAG, a first VPN tunnel with the at least one MVVS, if the first VPN channel is enabled by the MVVS;
   enabling, by the at least one MVAG, a third VPN channel with the at least one MVVS, if a plurality of proper credentials are established;
   establishing, by the MVVS, a third VPN tunnel on demand between the MVVS and the MVAG, pending a completion in establishing a second VPN tunnel on demand between the MVVS smart device client and the MVVS;
   enabling, by the MVVS, a second VPN channel on demand between the MVVS and the at least one MVVS smart device client from a cloud in an Internet; and
   establishing, by the at least one MVVS smart device client, the second VPN tunnel on demand between the MVVS and the at least one MVVS smart device client;
   wherein the second VPN tunnel on demand and the third VPN tunnel on demand are channeled into a single VPN tunnel between the MVVS smart device client and the MVAG through the MVVS, and ultimately to the at least one MVAG smart device client, the at least one MVAG network service and the another MVVS smart device client.

8. The method of claim 1, wherein the step of establishing the plurality of initial VPN tunnels between the MVVS and the MVAG comprises:
   calling back, by the at least one MVVS in the public cloud network, the at least one MVAG in a private LAN of the at least one MA to enable a first VPN channel;
   establishing, by the at least one MVAG, a first VPN tunnel with the at least one MVVS, if the first VPN channel is enabled by the MVVS;
   enabling, by the MVVS, a second VPN channel on demand between the MVVS and at least one MVVS smart device client from a cloud in an Internet; and
   establishing, by the at least one MVVS smart device client, the second VPN tunnel on demand between the MVVS and the at least one MVVS smart device client;
   wherein the first VPN tunnel and the second VPN tunnel on demand are channeled into a single VPN tunnel between the MVVS smart device client and the MVAG through the MVVS, and ultimately to the at least one MVAG smart device client, the at least one MVAG network service and the another MVVS smart device client.

9. The method of claim 1, wherein the step of connecting to the MVAG on demand between the MVVS smart device client and the MVAG through the MVVS comprises:
   starting, by the at least one MVVS smart device client, request for a connection to the at least one MVVS through a MVVS VPN client profile to establish a second VPN tunnel on demand, in case that the at least one MVVS smart device client intends to access to the at least one MVAG smart device client or a metaverse network service (MVNS) on a private LAN of the at least one MA.

10. The method of claim 1, wherein the step of running the plurality of vertical P2P private and secure MVVS smart device client applications between the at least one MVVS smart device client and the one of the at least one MVAG smart device client, the at least one MVAG network service and the another MVVS smart device client comprises:
   joining, by the MVVS smart device client in the public cloud network, a private and secure communication session as a guest with a host MVVS smart device client;
   wherein the MVVS smart device client is available for access in a LAN mode for a VPN connection from the at least one MVVS smart device client;
   wherein the private and secure communication session includes at least one of a video, an audio, a text or an application, and the application includes a program, an utility, an operation or a transaction that is recognizable by the MVVS smart device client and the host MVVS smart device client;
   wherein the at least one MVAG smart device client along with the at least one MVAG network service on a private LAN of the at least one MVAG are available for access in the LAN mode for the VPN connection from the at least one MVVS smart device client.

11. The method of claim 10, wherein the application is a crypto currency application including a program, an utility, or a transaction that is recognizable by the at least one MVVS smart device client and the another MVVS smart device client, when the plurality of vertical P2P private and secure MVVS smart device client applications between the at least one MVVS smart device client and the another MVVS smart device client is run.

12. The method of claim 10, wherein the MVVS is configured on demand to offer the plurality of choices among geo-blocking, geo-portal, or geo-home in accessing an on-line content, when the plurality of vertical P2P private and secure MVVS smart device client applications between the at least one MVVS smart device client and the another MVVS smart device client is run.

13. The method of claim 1, wherein the at least one PCP comprises:
   an Internet service; and
   a program that executes instructions stored in memory to instruct the at least one PCP to:
      create and manage an authorized client list to accommodate the at least one PCP Admin Device;
      create and manage the plurality of connection credentials including a plurality of MVVS server credentials and a plurality of MVVS client credentials; and
      conduct the step of acquiring the plurality of connection credentials from the PCP Admin Device.

14. The method of claim 1, wherein the at least one VMS comprises:
   an Internet service; and
   a program that executes instructions stored in memory to instruct the at least one VMS to:
      create and manage an authorized client list to accommodate the at least one PCP Admin Device, the at least one MVAG, and the at least one MVVS; and
      manage a communication between the MVVS and the MVVS smart device client.

15. The method of claim 1, wherein the at least one PCP Admin device comprises:
   a computing device;
   a connection to a network; and
   a program that executes instructions stored in memory to instruct the at least one PCP Admin Device to:
      establish a first network service running in a LAN mode;
      establish a second network service based on Internet protocol;

establish a third network service based on an industry standard network protocol; and
conduct the step of acquiring the connection credentials from the PCP Admin Device.

16. The method of claim 1, wherein the at least one MVVS comprises:
a computing device;
a connection to a network; and
a program that executes instructions stored in memory to instruct the at least one MVVS to:
create and manage a first authorized client list to accommodate the at least one MVVS smart device client through at least one VPN connection;
create and manage a second authorized client list to accommodate the at least one MVAG through the at least one VPN connection;
conduct the step of pairing and registration with the MVVS from the MVAG;
conduct the step of establishing the plurality of initial VPN tunnels between the MVVS and the MVAG; and
conduct the step of connecting to the MVAG on demand between the MVVS smart device client and the MVAG through the MVVS.

17. The method of claim 1, wherein the at least one MVVS smart device client comprises:
a computing device;
a connection to a network; and
a program that executes instructions stored in memory to instruct the MVVS smart device client to:
establish a first network service based on Internet protocol;
establish a second network service based on an industry standard network protocol;
create and manage an Internet connection with the at least one VMS and the at least one MVVS through a VPN connection;
create and manage a connection with the at least one MVAG smart device client through the VPN connection;
conduct the step of connecting to the MVAG on demand between the MVVS smart device client and the MVAG through the MVVS; and
conduct the step of running the plurality of vertical P2P private and secure MVVS smart device client applications between the at least one MVVS smart device client and the one of the at least one MVAG smart device client, the at least one MVAG network service and the another MVVS smart device client.

18. The method of claim 1, wherein the at least one metaverse application (MA) comprises:
an Internet router;
at least one private LAN;
at least one metaverse network service;
the at least one MVAG smart device client; and
the at least one MVAG.

19. The method of claim 1, wherein the at least one MVAG comprises:
a computing device;
a connection to a network; and
a program that executes instructions stored in memory to instruct the at least one MVAG to:
create and manage an authorized client list to accommodate the at least one MVVS through a VPN connection;
conduct the step of pairing and registration with the MVVS from the MVAG;
conduct the step of establishing the plurality of initial VPN tunnels between the MVVS and the MVAG;
conduct the step of connecting to the MVAG on demand between the MVVS smart device client and the MVAG through the MVVS; and
conduct the step of running the plurality of vertical P2P private and secure MVVS smart device client applications between the at least one MVVS smart device client and the one of the at least one MVAG smart device client, the at least one MVAG network service and the another MVVS smart device client.

20. The method of claim 1, wherein the at least one MVAG network service comprises:
a first network service running in a LAN mode to avoid monitoring or recording due to a strength of an industry recognized VPN tunnel;
a second network service based on Internet protocol;
a third network service based on an industry standard network protocol;
a fourth network service that is platform agnostic and simultaneously compatible with all existing fragmented IoT device; and
a fifth network service based on the step of connecting to the MVAG on demand between the MVVS smart device client and the MVAG through the MVVS.

21. The method of claim 1, wherein the at least one MVAG smart device client comprises:
a computing device;
a connection to a network; and
a program that executes instructions stored in memory to instruct the at least one MVAG smart device client to:
establish a first network service running in a LAN mode;
establish a second network service based on Internet protocol;
establish a third network service based on an industry standard network protocol;
conduct the step of connecting to the MVAG on demand between the MVVS smart device client and the MVAG through the MVVS; and
conduct the step of running the plurality of vertical P2P private and secure MVVS smart device client applications between the at least one MVVS smart device client and the at least one MVAG smart device client.

22. The method of claim 1, wherein the at least one MVAG Admin device comprises:
a computing device;
a connection to a network; and
a program that executes instructions stored in memory to instruct the at least one MVAG Admin Device to:
establish a first network service running in a LAN mode;
establish a second network service based on Internet protocol;
establish a third network service based on an industry standard network protocol; and
conduct the step of pairing and registration with the MVVS from the MVAG.

23. The method of claim 1, wherein the at least one VPN tunnel comprises:
at least one first network service based on Internet protocol;
at least one second network service based on an industry standard network protocol;
a privacy and a security, as well as a future proof interoperability and compatibility in a communication;
a LAN mode access through the at least one VPN tunnel;

at least one first VPN tunnel of the plurality of initial VPN tunnels between the MVVS and the MVAG; and at least one second VPN tunnel between the MVVS smart device client and the MVAG through the MVVS.

* * * * *